US012616171B2

(12) United States Patent
Mondloch et al.

(10) Patent No.: US 12,616,171 B2
(45) Date of Patent: May 5, 2026

(54) ANIMAL GROOMING TOOL AND METHODS

(71) Applicant: Spectrum Brands, Inc., Middleton, WI (US)

(72) Inventors: Elizabeth Lee Mondloch, Middleton, WI (US); William D. Himes, Middleton, WI (US); Terry Allen Willemin, Middleton, WI (US); William Nathan Brunner, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 18/919,045

(22) Filed: Oct. 17, 2024

(65) Prior Publication Data

US 2025/0338823 A1     Nov. 6, 2025

Related U.S. Application Data

(60) Provisional application No. 63/643,139, filed on May 6, 2024.

(51) Int. Cl.
*A01K 13/00*          (2006.01)
*A46B 5/00*           (2006.01)
          (Continued)

(52) U.S. Cl.
CPC .......... *A01K 13/002* (2013.01); *A46B 5/0008* (2013.01); *A46B 9/02* (2013.01);
          (Continued)

(58) Field of Classification Search
CPC ........ A01K 13/002; A46B 5/021; A46B 9/005
See application file for complete search history.

(56) References Cited

U.S. PATENT DOCUMENTS 223,137 A * 12/1879 Holmes et al. ...... A01K 13/002
                                                         119/613
239,756 A * 4/1881 Forsyth ................ A01K 13/002
                                                         119/613

(Continued)

FOREIGN PATENT DOCUMENTS

CA        2503925 A1 * 10/2006 ........... A01K 13/002
WO     2016139661 A1    9/2016

OTHER PUBLICATIONS

International Search Report and Written Opinion for PCT/US2025/027890 (Oct. 23, 2025).

(Continued)

*Primary Examiner* — Christopher D Hutchens
*Assistant Examiner* — Nevena Aleksic
(74) *Attorney, Agent, or Firm* — Greenberg Traurig, LLP; Danielle Abramson; Heath Briggs

(57) ABSTRACT

A grooming tool for use on an animal, such as a dog, includes a handle, a head extending from the handle, a first section of a first grooming characteristic extending from a first side of the head, a second section of a second grooming characteristic different from the first grooming characteristic extending from a second side of the head, and a movable cover member pivotably attached to the head and positionable to selectively cover and uncover the first section. The first section can be a dematting section, while the second section can be a combing section.

23 Claims, 30 Drawing Sheets

(51) Int. Cl.
    *A46B 9/02*            (2006.01)
    *A46B 17/04*          (2006.01)
    *A46B 17/06*          (2006.01)

(52) U.S. Cl.
    CPC .............. *A46B 17/04* (2013.01); *A46B 17/06* (2013.01); *A46B 2200/1093* (2013.01)

(56)           References Cited

U.S. PATENT DOCUMENTS

| | | | |
|---|---|---|---|
| 276,696 | A * | 5/1883 | Lawrence ............ A01K 13/002 119/613 |
| 278,869 | A * | 6/1883 | Bunce et al. ........ A01K 13/002 119/613 |
| 293,415 | A * | 2/1884 | Canfield .............. A01K 13/002 119/613 |
| 309,668 | A * | 12/1884 | Weightman .......... A01K 13/002 119/613 |
| 505,951 | A * | 10/1893 | Neuls ................... A01K 13/002 119/631 |
| 575,544 | A * | 1/1897 | Decker ................ A01K 13/002 119/613 |
| 623,201 | A * | 4/1899 | Brain ................... A01K 13/002 119/608 |
| 679,933 | A * | 8/1901 | Alston ................. A01K 13/002 119/611 |
| 693,259 | A * | 2/1902 | Gilbert ................ A01K 13/002 119/628 |
| 852,547 | A * | 5/1907 | Finegan .............. A01K 13/002 119/613 |
| 863,457 | A * | 8/1907 | Seymour ............. A01K 13/002 119/613 |
| 1,025,793 | A * | 5/1912 | Endsley .............. A01K 13/002 119/615 |
| 1,236,126 | A * | 8/1917 | Wightman ............... A47L 1/06 15/117 |
| 1,307,702 | A * | 6/1919 | Rogers et al. ....... A01K 13/002 119/613 |
| 1,504,365 | A * | 8/1924 | Mayhood ............... A46B 9/005 15/231 |
| 1,590,267 | A * | 6/1926 | Trester .................. A46B 17/04 15/185 |
| 1,903,161 | A * | 3/1933 | Barkan ................... A46B 5/00 601/141 |
| 2,156,416 | A * | 5/1939 | Wikander ............ A01K 13/002 119/626 |
| 2,160,618 | A * | 5/1939 | Kreutzig ............... A46B 15/00 206/823 |
| D123,180 | S * | 10/1940 | Pileggi ............................ D28/25 |
| D195,393 | S * | 6/1963 | Safianoff et al. .............. D28/29 |
| D212,575 | S * | 10/1968 | Solomon ......................... D28/29 |
| 3,491,725 | A * | 1/1970 | Maniscalco .......... A01K 13/002 56/400.21 |
| 3,491,777 | A * | 1/1970 | Grosbard ................. A46B 7/02 401/137 |
| 4,237,822 | A * | 12/1980 | Kaiser, Jr. ......... A46B 11/0055 401/181 |
| 4,277,193 | A * | 7/1981 | Knaus ..................... A46B 7/02 132/148 |
| D289,567 | S * | 4/1987 | O'Connor ....................... D28/25 |
| 5,022,350 | A * | 6/1991 | Sequist ............... A01K 13/002 132/148 |
| 5,152,306 | A * | 10/1992 | Stephan ................. A45D 24/02 132/219 |
| D370,304 | S * | 5/1996 | Schach .......................... D28/29 |
| 5,655,482 | A * | 8/1997 | Lundquist ............ A01K 13/002 119/625 |
| 5,819,355 | A * | 10/1998 | Wu ......................... A63B 57/60 15/160 |
| 5,862,780 | A * | 1/1999 | Landreneau .......... A45D 24/30 119/625 |
| 5,908,036 | A * | 6/1999 | Andrews ................. B26B 21/10 132/289 |
| 5,957,090 | A * | 9/1999 | Larson ................. A01K 13/002 15/1.52 |
| D434,566 | S | 12/2000 | Mann |
| 6,199,513 | B1 * | 3/2001 | Nichols ................. A01K 13/002 119/633 |
| 6,955,137 | B2 * | 10/2005 | Dunn .................... A01K 13/002 119/617 |
| 7,621,234 | B2 * | 11/2009 | Roy ......................... A46B 7/10 119/613 |
| 7,640,893 | B2 * | 1/2010 | Woods ................. A01K 13/002 119/613 |
| D610,756 | S * | 2/2010 | Lin .............................. D30/159 |
| 7,665,422 | B2 * | 2/2010 | Kissel, Jr. .......... A46B 15/0061 119/664 |
| D619,309 | S * | 7/2010 | Vandervoet ................... D30/158 |
| 7,748,350 | B2 * | 7/2010 | Vandervoet .......... A01K 13/002 119/618 |
| 8,132,541 | B1 * | 3/2012 | Baer, Jr. ................. A46B 9/023 119/664 |
| 8,790,354 | B2 * | 7/2014 | Makosky ............. A01K 13/002 359/802 |
| 9,004,009 | B2 * | 4/2015 | Kissel, Jr. ........... A46B 13/005 119/609 |
| 9,807,978 | B2 * | 11/2017 | Longoria ............. A01K 13/002 |
| 9,961,879 | B1 * | 5/2018 | Quinn .................... A46B 13/02 |
| D836,855 | S * | 12/2018 | Moeller ....................... D30/159 |
| 10,869,543 | B2 * | 12/2020 | Chang ................... A46B 9/028 |
| 11,490,724 | B2 * | 11/2022 | Huang ................... A01K 13/00 |
| 11,510,393 | B2 * | 11/2022 | Barnard .............. A01K 13/002 |
| D1,002,936 | S * | 10/2023 | Hadley ......................... D28/29 |
| 12,369,564 | B2 * | 7/2025 | Zhong ................. A01K 13/002 |
| D1,091,010 | S * | 8/2025 | Fan .............................. D30/159 |
| 12,377,559 | B2 * | 8/2025 | Axelrod ................. B26B 19/24 |
| 2005/0150465 | A1 * | 7/2005 | Dunn ................... A01K 13/002 119/601 |
| 2005/0241594 | A1 * | 11/2005 | Willinger ............. A01K 13/002 119/625 |
| 2008/0066690 | A1 * | 3/2008 | Rosen .................. A01K 13/002 119/612 |
| 2008/0115735 | A1 * | 5/2008 | Wang ................... A01K 13/002 30/30 |
| 2012/0304938 | A1 * | 12/2012 | Wang ................... A01K 13/002 29/428 |
| 2014/0026821 | A1 * | 1/2014 | Tu ........................ A01K 13/002 119/600 |
| 2015/0101544 | A1 * | 4/2015 | Ablow ................. A01K 13/002 119/600 |
| 2017/0099806 | A1 * | 4/2017 | Kramer ............... A01K 13/002 |
| 2017/0290291 | A1 * | 10/2017 | Moeller ............... A46D 1/0253 |
| 2020/0137950 | A1 * | 5/2020 | Varrichio ................. A01D 7/08 |
| 2022/0361447 | A1 * | 11/2022 | Mahtani ............ A46B 15/0081 |
| 2023/0036461 | A1 | 2/2023 | Axelrod et al. |
| 2023/0404033 | A1 * | 12/2023 | Xue ......................... A46B 1/00 |
| 2024/0081287 | A1 * | 3/2024 | Lee ......................... B26B 21/16 |
| 2025/0176499 | A1 * | 6/2025 | Yi ........................ A01K 13/002 |

OTHER PUBLICATIONS

Invitation to Pay Additional Fees for PCT/US2025/027890 (Sep. 1, 2025).

* cited by examiner

*FIG. 13*

ANIMAL GROOMING TOOL AND METHODS

This application claims priority to U.S. 63/643,139, filed May 6, 2024, incorporated herein by reference.

TECHNICAL FIELD

This disclosure relates grooming tools for animals, especially fur-coated animals. In particular, this disclosure relates to grooming tools for furry pets, in which the grooming tool has more than one brush characteristic.

BACKGROUND

Many households include animals as pets. For animals with fur coats, it is helpful to groom the animal to help keep the fur coat healthy and to prevent shedding of the fur throughout the owner's house.

Dogs, such as poodles and poodle-crosses, often referred to as "doodles", can be a challenge to easily groom due to the curly hair/fur. Matted, snarled fur make it even more difficult to groom.

There are a variety of types of grooming tools available including, for example, mat breakers, curry combs, bristle brushes, wire pin brushes, and slicker brushes.

It can be burdensome to have multiple grooming tools. Improvements are desirable.

SUMMARY

An animal grooming tool is provided that improves the prior art.

In an aspect, a grooming tool for use on an animal is provided. The tool comprising: a handle defining a handle longitudinal axis; the handle being configured and sized for grasping by a human hand, such that a human hand wraps around the handle longitudinal axis during grasping; a head extending from the handle; the head having a plurality of sides and a head longitudinal axis co-linear with or parallel to the handle longitudinal axis; a first section of a first grooming characteristic extending from a first side of the head in a direction perpendicular to the head longitudinal axis; a second section of a second grooming characteristic different from the first grooming characteristic; the second section extending from a second side of the head and in a direction perpendicular to the head longitudinal axis; and a movable cover member pivotably attached to the head and positionable to selectively cover and uncover the first section.

In an example embodiment, the second side of the head is opposite of the first side of the head, such that the first section and second section are 180° apart, extending in opposite directions.

In some arrangements, the first grooming characteristic is dematting, and wherein the first section has a plurality of spaced, dematting teeth.

In example implementations, each of the de-matting teeth includes a plate contained within a plane perpendicular to the head longitudinal axis, the plate comprising: a base in contact with the head; straight rear surface extending from the base; a curved front surface, opposite of the rear surface; and a tine at a terminal end.

In an example embodiment, the dematting teeth are spaced from each other at non-uniform distances, with a closest space between the dematting teeth being closest to the handle, and the spacing incrementally increasing to the last of the dematting teeth adjacent a terminal end of the head, remote from the handle.

In some arrangements, the second grooming characteristic is combing, wherein the second section has a plurality of spaced comb tines.

In an example embodiment, the comb tines are spaced from each other at non-uniform distances, with a closest space between the comb tines being closest to the handle, and the spacing incrementally increasing to the last of the comb tines adjacent a terminal end of the head, remote from the handle.

In example implementations, the cover member is positioned relative to the first section such that when the cover member pivots to a position covering the first section, the cover member removes hair or fur from the first section.

Some arrangements further include a locking mechanism to selectively lock and unlock the cover member in a closed position, covering the first section.

In an example embodiment, the locking mechanism includes a first sliding lock member projecting from the cover member and a second lock member in the handle; the second lock member having a recess arrangement receiving the first sliding lock member.

In example implementations, the handle has a thumb rest located in a plane 90° relative to the first section and second section.

In some arrangements, the handle has a finger rest on an opposite side of the handle from the thumb rest; the finger rest being located in a plane 90° relative to the first section and second section.

In an example embodiment, the head includes a thumb rest groove extending a complete length of the head located in a third side between the first section and second section.

In example implementations, the second grooming characteristic is combing, wherein the second section has a plurality of spaced comb tines; and there are between 10-15 dematting teeth, and 10-15 comb tines.

Examples further include a body; the body including a handle core and the head; the handle core being covered by a handle cover; the handle core and handle cover defining the handle.

The body can include a first body section and a second body section mated together with the head longitudinal axis passing therebetween.

Embodiments may further include a back panel held between the first body section and the second body section.

In some embodiments, the first body section holds a plurality of spaced, dematting teeth.

In some arrangements, the dematting teeth have at least first and second spacing sections; the dematting teeth being spaced uniformly from each other within each of the first and second spacing sections; and spacing between the dematting teeth being smaller in the first spacing section than the second spacing section.

Some examples include the dematting teeth having at least first and second spacing sections; the dematting teeth being spaced uniformly from each other within each of the first and second spacing sections; and spacing between the dematting teeth being smaller in the first spacing section than the second spacing section.

In some arrangements, the first spacing section is adjacent to the handle, and the second spacing section is adjacent to a terminal end of the head, remote from the handle.

In example implementations, the second body section holds a plurality of spaced, comb tines.

In some embodiments, the comb tines have at least first and second spacing regions; the comb tines being spaced uniformly from each other within each of the first and second spacing regions; and spacing between the comb tines being smaller in the first spacing region than the second spacing region.

In example implementations, the comb tines have at least first and second spacing regions; the comb tines being spaced uniformly from each other within each of the first and second spacing regions; and spacing between the comb tines being smaller in the first spacing region than the second spacing region.

In some arrangements, the first spacing region is adjacent to the handle, and the second spacing region is adjacent to a terminal end of the head, remote from the handle.

Some implementations further include a locking mechanism to selectively lock and unlock the cover member in a closed position, covering the first section.

In some embodiments, the locking mechanism includes a first lock member projecting from the cover member and a second lock member in the head; the second lock member having a recess arrangement receiving the first lock member.

In example implementations, the handle cover has a thumb rest and a finger rest located 180° relative to each other.

In some arrangements, the thumb rest is located in a plane aligned with the second section.

In some embodiments, the finger rest being located in a plane aligned with the first section.

In another aspect, a method of grooming an animal is provided. The method comprising: dematting hair on an animal by pivoting a cover member on a grooming tool to uncover a plurality of spaced, dematting teeth on a head of a grooming tool and using the dematting teeth to remove matted hair; and combing hair on the animal by using a plurality of spaced comb tines on the head extending in a direction opposite from the dematting teeth.

Some methods further include holding a handle attached to the head, the handle having a handle longitudinal axis, such that a human hand wraps around the handle longitudinal axis while holding; and the head has a head longitudinal axis co-linear with or parallel to the handle longitudinal axis.

Some methods further include a step of removing hair from the dematting teeth by pivoting the cover member to a position covering the dematting teeth.

Some methods further include locking the cover member in the position covering the dematting teeth.

Some methods further include positioning a thumb in a groove extending a complete length of the head located in a side between the dematting teeth and the comb tines.

In many example methods, the dematting teeth are spaced from each other at non-uniform distances, with a closest space between the dematting teeth being closest to the handle, and the spacing incrementally increasing to the last of the dematting teeth adjacent a terminal end of the head, remote from the handle; and the comb tines are spaced from each other at non-uniform distances, with a closest space between the comb tines being closest to the handle, and the spacing incrementally increasing to the last of the comb tines adjacent a terminal end of the head, remote from the handle.

In some example methods, the dematting teeth have at least first and second spacing sections; the dematting teeth being spaced uniformly from each other within each of the first and second spacing sections; and spacing between the dematting teeth being smaller in the first spacing section than the second spacing section; and the comb tines have at least first and second spacing regions; the comb tines being spaced uniformly from each other within each of the first and second spacing regions; and spacing between the comb tines being smaller in the first spacing region than the second spacing region.

In another aspect, a grooming tool for use on an animal is provided. The tool comprises: (a) a handle defining a handle longitudinal axis; the handle being configured and sized for grasping by a human hand, such that a human hand wraps around the handle longitudinal axis during grasping; (b) a head extending from the handle; the head having a plurality of sides; (c) a first section of a first grooming characteristic extending from a first side of the head; (i) the first section having a plurality of spaced teeth; each of the teeth including a plate comprising: a base in contact with the head; a straight rear surface extending from the base; a curved front surface, opposite of the rear surface; and a tine at a terminal end; and (d) a movable member attached to the head; wherein the member is positioned relative to the first section such that when the member moves relative to the first section, the member removes hair or fur from the first section.

In some examples, the cover member has a wall section with a plurality of slots positioned and sized to receive the teeth.

In some implementations, each slot has a width sized to receive one of the teeth, so that the plate is parallel to and sandwiched between opposite sides of each slot.

In one or more embodiments, the wall section of the cover member includes a bend in the wall section.

Some examples further include a locking mechanism.

The present technology may be more completely understood and appreciated in consideration of the following detailed description of various embodiments in connection with the accompanying drawings.

BRIEF DESCRIPTION OF THE DRAWINGS

FIG. 13 is a perspective view of the cover used with the grooming tool of FIG. 1;

The figures are rendered primarily for clarity and, as a result, are not necessarily drawn to scale. Moreover, various structure/components, including but not limited to fasteners, and the like, may be shown diagrammatically or removed from some or all of the views to better illustrate aspects of the depicted embodiments, or where inclusion of such structure/components is not necessary to an understanding of the various exemplary embodiments described herein. The lack of illustration or description of such structure/ components in a particular figure is, however, not to be interpreted as limiting the scope of the various embodiments in any way.

DETAILED DESCRIPTION

A grooming tool is shown in general at 20 (FIGS. 1-16) and 220 (FIGS. 17-36). The tool 20, 220 is particularly useful for grooming animals, such as dogs. As further explained, the tool 20 may also be particularly useful for dogs with curly fur, such as poodles and poodle-crosses ("doodles").

The Embodiment of FIGS. 1-16

Figure 5:
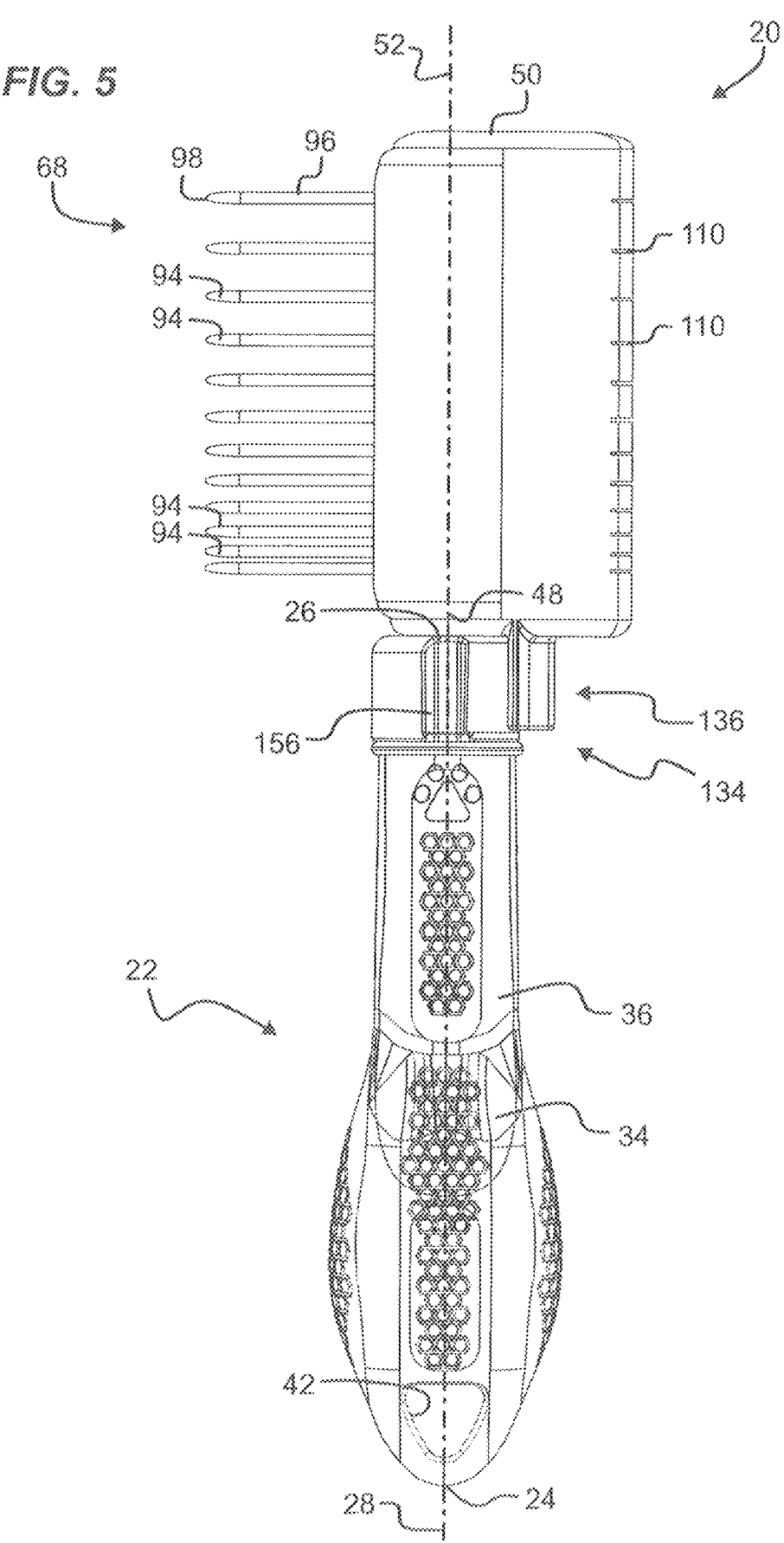
FIG. 5 is a top plan view of the grooming tool of FIG. 1.
Figure 16:
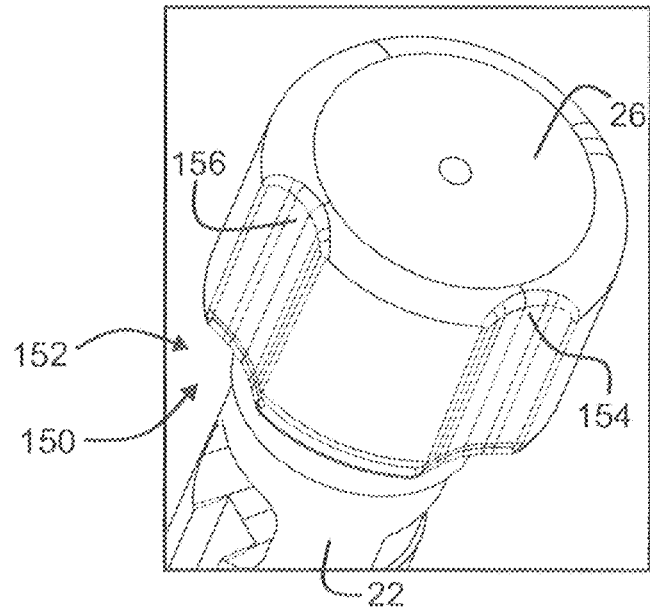
FIG. 16 is an enlarged, perspective view of a second member of the lock mechanism on the handle of the grooming tool of FIG. 1.

The tool 20 includes a handle 22. The handle 22 is sized and configured for being grasped by a human hand, such that a thumb is on one side of the handle 22, with the remaining fingers wrapped around the handle 22 and resting on an opposite side of the handle 22. Referring to FIG. 5, the handle 22 has a free end 24 and an opposite head-engaging end 26 (FIG. 16). A handle longitudinal axis 28 extends between the free end 24 and head-engaging end 26. When held by a human hand, the hand wraps around the handle longitudinal axis 28.

Figure 4:
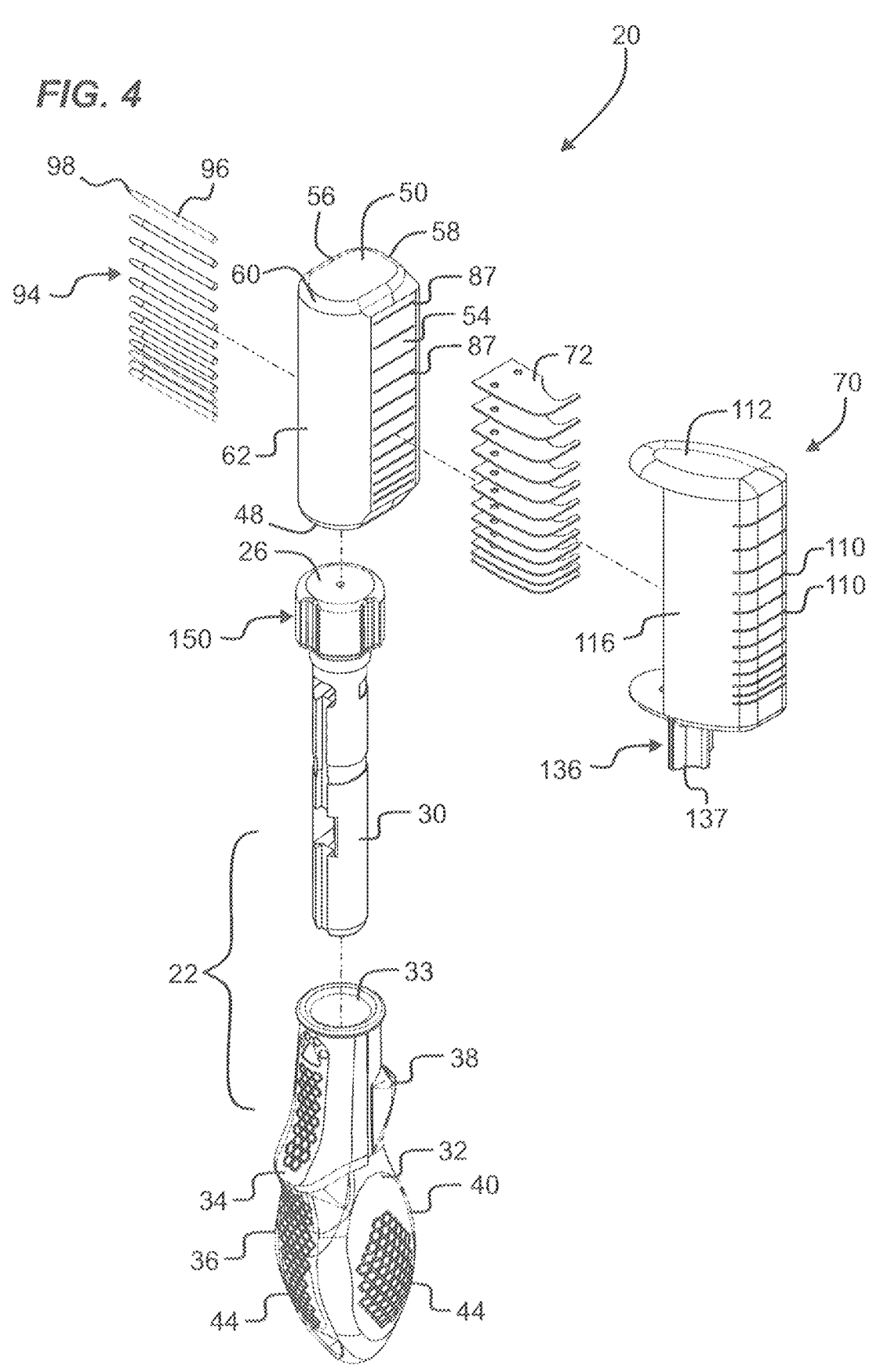
FIG. 4 is an exploded, perspective view of the grooming tool of FIG. 1.

FIG. 4 shows an exploded view of the tool 20. The handle 22 includes a handle core 30, which is covered by a handle cover 32. The handle cover 32 has an interior 33, which receives the core 30.

Preferably, the handle cover 32 includes optional ergonomic features to make the tool 20 convenient and easy to use. The handle 22 has a thumb rest 34. The thumb rest 34 is on a first side 36 of the handle cover 32 positioned for resting a thumb during use. The handle 22 also preferably has a finger rest 38. The finger rest 38 is on a second side 40, opposite of the first side 36 and from the thumb rest 34, for resting one or more of the remaining fingers (index finger, for example).

The handle 22 further has an optional through hang hole 42 adjacent to the free end 24. The handle cover 32 has optional texturing 44 for making the handle 22 easier for gripping.

The tool 20 includes a head 46. The head 46 extends from the handle 22. Referring to FIG. 5, the head 46 has a handle-engaging end 48 and an opposite free end 50. The handle-engaging engaging end 48 abuts the head-engaging end 26 of the handle 22. The head 46 has a head longitudinal axis 52 passing through the head-engaging end 26 and the free end 50. The head longitudinal axis 52 can be co-linear with or parallel to the handle longitudinal axis 28.

The head 46 can be a variety of shapes. In the example embodiment shown and in reference to FIG. 4, the head 46 has a cross-section with a parallel first side 54 and second side 56, joined by opposite third and fourth sides 58, 60. In the example shown, the fourth side 60 has a curved face 62. The third side 58 has an optional thumb rest groove 64 (FIG. 2) extending a complete length of the head 46 between the free end 50 and handle-engaging end 48.

In accordance with principles of this disclosure, the grooming tool 20 has a first section 66 of a first grooming characteristic. By "grooming characteristic", it is meant a grooming function and/or a size. That is, there are various types of grooming functions, depending on what is desired to be accomplished by the grooming. Types of grooming characteristics, i.e. grooming functions, include: deshedding (removing loose, dead undercoat); dematting to remove mats; pin brushes to fluff detangled or wiry coats; bristle brushes as finishing tools to distribute natural oils and add shine; slicker brushes to detangle and remove lighter mats; rubber curry combs for massaging skin; and various types of combs for detangling, dematting, or fluffing. Size differences can include density (such as bristle or tooth density) and/or length of bristles/teeth.

The first section 66 having first grooming characteristic extends from the head 46 in a first direction, perpendicular to the head longitudinal axis. In the example of FIG. 4, the first grooming characteristic extends from the first side 54 of the head 46 in a direction perpendicular to the head longitudinal axis 52.

In accordance with principles of this disclosure, the grooming tool 20 has a second section 68 of a second grooming characteristic. The second grooming characteristic is different from the first grooming characteristic. By "different", it is meant that the second grooming characteristic has a grooming function and/or size that is not identical to the first grooming characteristic. The second section 68 extends from the head 46 in a second direction perpendicular to the head longitudinal axis 52, and the second direction is different from the first direction. In the example of FIG. 4, the second section 68 extends from the second side 56 of the head 46 and in a direction perpendicular to the head longitudinal axis 52.

The second section 68 extends from the second side 56 of the head 46 and in a direction perpendicular to the head longitudinal axis 52.

Preferably, the second direction is opposite of the first direction, such that the first section 66 and second section 68 are 180° apart, extending in opposite directions. For example, the second side 56 of the head 46 is opposite of the first side 54 of the head 46, such that the first section 66 and second section 68 are 180° apart, extending in opposite directions from each other.

The grooming tool 20 is designed with ergonomic principles to allow for easy grooming and optimal hand leverage. As such and in reference to FIGS. 5 and 6, in this embodiment, a base of the thumb rest 34 is located in a plane (along the first side 36 of the handle 22), which is 90° relative to a base of the first section 66 and a base of the second section 68. Likewise, a base of the finger rest 38 is located in a plane (along the second side 40 of the handle 22), which is 90° relative to the base of the first section 66 and the base of the second section 68. In other words, the thumb rest 34 projects from a first plane located along the first side 36 of the handle 22; the first section 66 projects from a second plane located along the first side 54 of the head 46; the second section 68 projects from a third plane located along the second side 56 of the head 46; and the finger rest 38 projects from a fourth plane located along the second side 40 of the handle 22. In preferred embodiments, the first plane is 90° relative to the second and third planes; the fourth plane is 90° relative to the second and third planes; the first plane and fourth plane are generally parallel; and the second and third planes are generally parallel. The optional thumb rest groove 64 (FIG. 2) has a base in the third side 58 of the head 46 between the second and third planes.

In accordance with principles of this disclosure, the grooming tool 20 has a cover member 70. The cover member 70 is positionable to selectively cover and uncover the first section 66.

Figure 1:
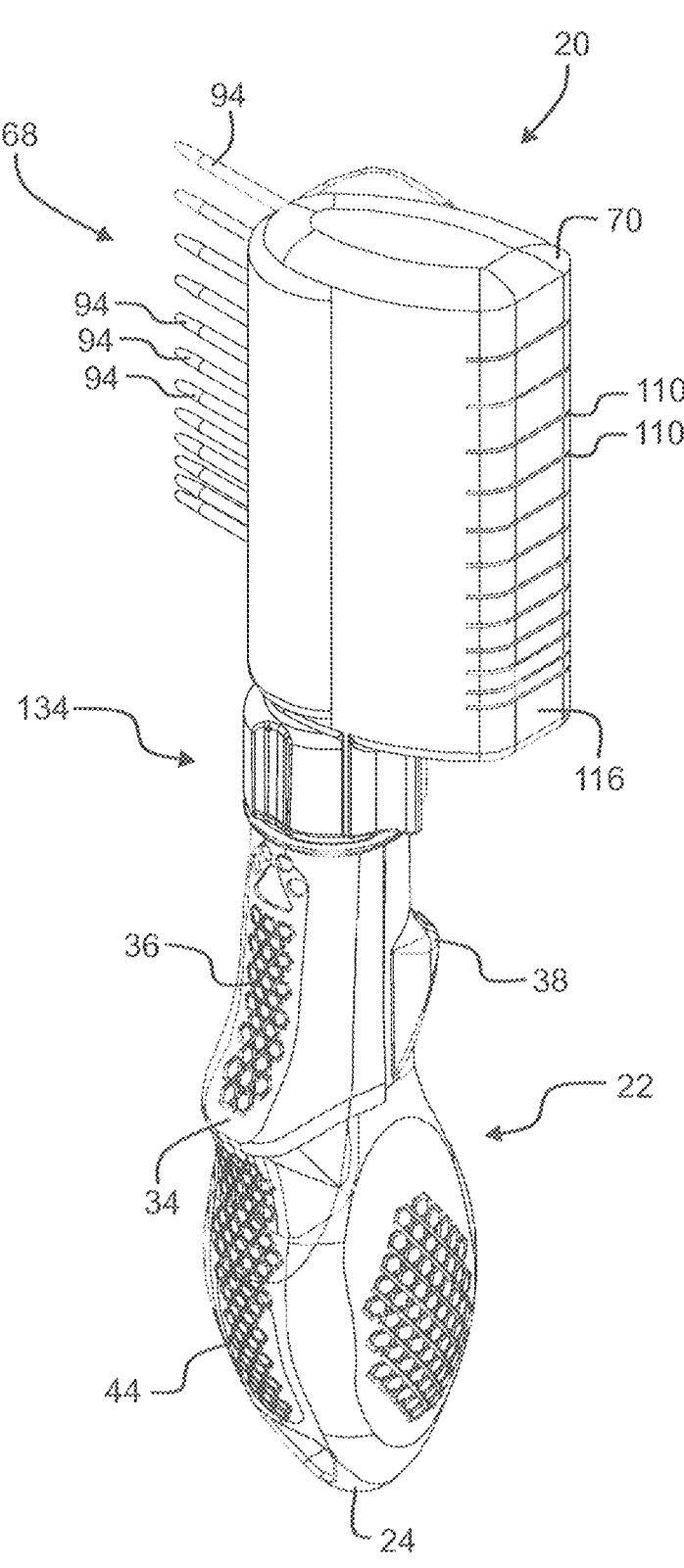
FIG. 1 is a perspective view of an embodiment of a grooming tool for an animal, showing a movable cover in a closed position.
Figure 2:
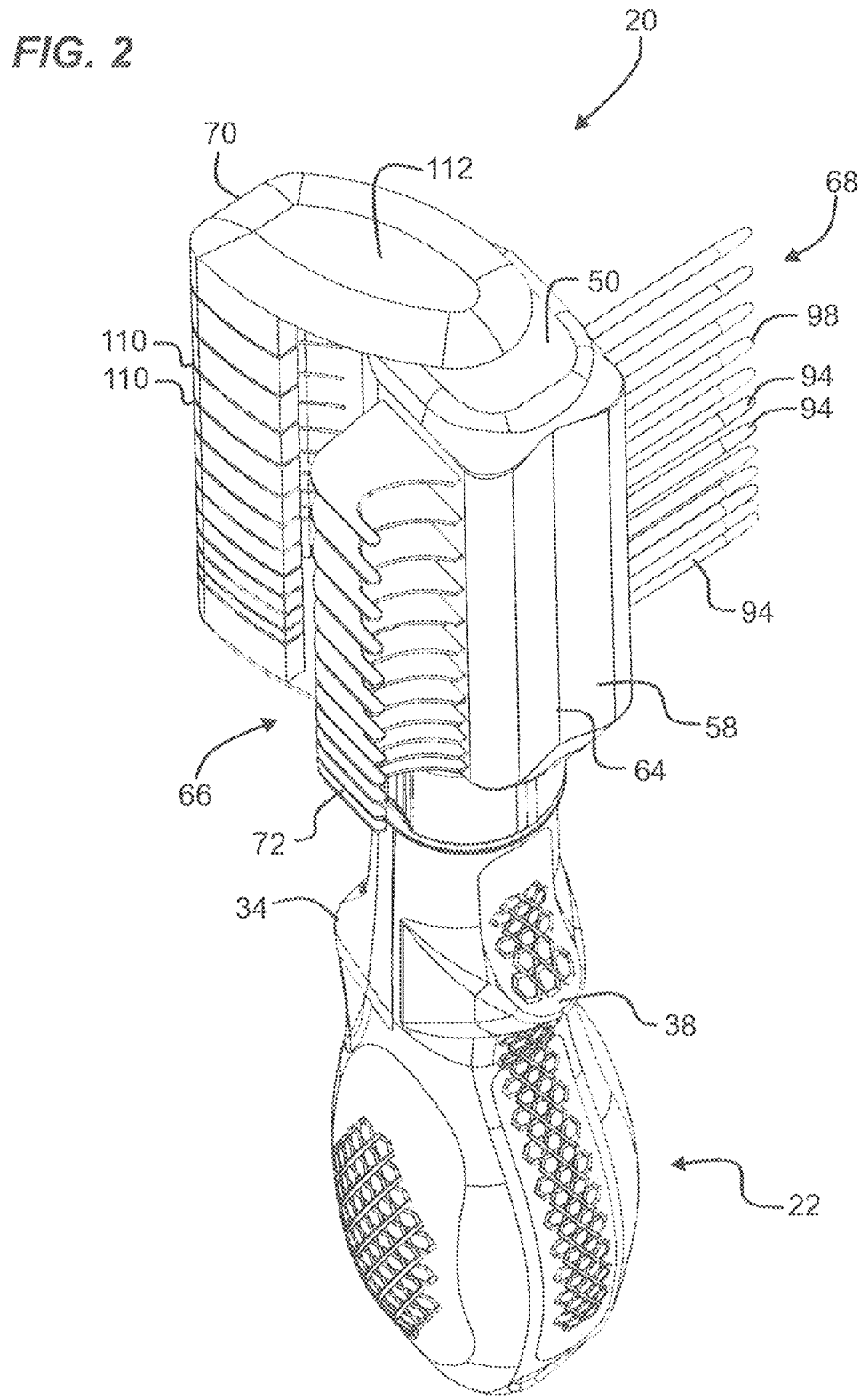
FIG. 2 is a perspective view of the grooming tool of FIG. 1, showing the cover in a partially open position.
Figure 3:
FIG. 3 is a perspective view of the grooming tool of FIG. 1, showing the cover in a fully open position.

In example embodiments, the cover member 70 is a movable cover member 70 pivotably attached to the head 46 and positionable to selectively cover and uncover the first section 66. In preferred implementations, the cover member 70 pivots about a pivot axis that is either co-linear with or generally parallel to the head longitudinal axis 52. FIG. 1 illustrates the cover member 70 in a closed position, covering the first section 66. FIG. 3 illustrates the cover member 70 in an open position, exposing for use, or uncovering the first section 66. FIG. 2 illustrates the cover member 70 between the closed position of FIG. 1 and open position of FIG. 3. More discussion of a preferred embodiment of the cover member 70 is below.

The first grooming characteristic of the first section 66 may be one of many. In the particular embodiment illustrated, the first grooming characteristic is dematting. By "dematting" it is meant a tool that removes matted hair or fur by one or both of cutting or combing.

In this embodiment, the first section 66 has a plurality of spaced dematting teeth 72. In reference now to FIG. 14, each of the dematting teeth 72 includes a plate 74. The plate 74 has a base 76 in contact with the head 46. Extending from the base 76 is a rear surface 78, shown here as straight, but could be other shapes. The plate 74 has a curved front surface 80, opposite of the rear surface 78. The plate 74 further includes a tine 82 at a terminal end 84, the terminal end 84 being on an opposite end of the plate 74 from the base 76. The curved front surface 80 may include a sharp, cutting edge 86.

Figure 14:
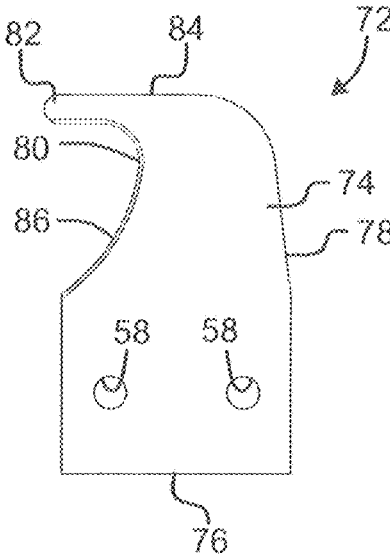
FIG. 14 is a top plan view of one of the dematting teeth used with the grooming tool of FIG. 1.

The plate 74 of each of the teeth 72 extends from the head 46. In the example shown, the plate 74 is contained within a plane perpendicular to the head longitudinal axis 52. In FIG. 4, the head 46 is shown with a plurality of slots 87 along the first side 54, each slot 87 receiving one of the teeth 72. In FIG. 14, each plate 74 has a pair of through holes 88, which are used to fasten each plate 74 to the head 46.

In reference now to FIG. 3, the dematting teeth 72 are arranged in a manner to be able to address fur matts of various sizes (e.g., small, medium, and large matts). This function is achieved by having the dematting teeth 72 spaced apart from each other at non-uniform distances. In the example shown, a closest space 90 between the dematting teeth 72 is closest to the handle 22. The spacing between the teeth 72 incrementally increases to a last 91 of the dematting teeth 72, with a largest space 92, adjacent a terminal end/free end 50 of the head 46, remote from the handle 22. Variations are possible, including groups of three or several of the teeth 72 having a same spacing, with other groups of three or several of the teeth 72 having a same spacing but different from other groups of teeth 72.

There can be a variety of numbers of dematting teeth 72. For example, there can be at least 8, or at least 10; no greater than 30, or no greater than 20. In many cases, there are between 10-15 dematting teeth 72. In the example shown, there are 12 dematting teeth 72.

The second grooming characteristic can be one of many. In the example shown, the second grooming characteristic is combing. By "combing", it is meant a tool used to comb/to untangle fur or hair.

In this embodiment, the second section 68 has a plurality of spaced comb tines 94. In the example shown, the tines 94 are contained in a common plane that is perpendicular to each plate 74 of the dematting teeth 72. Each of the tines 94 extends from the second side 56 of the head 46. Many different shapes are possible. In this example, each tine 94 has a generally round cross-section and extends along a cylinder body 96, narrowing to a free, terminal end 98.

Figure 6:
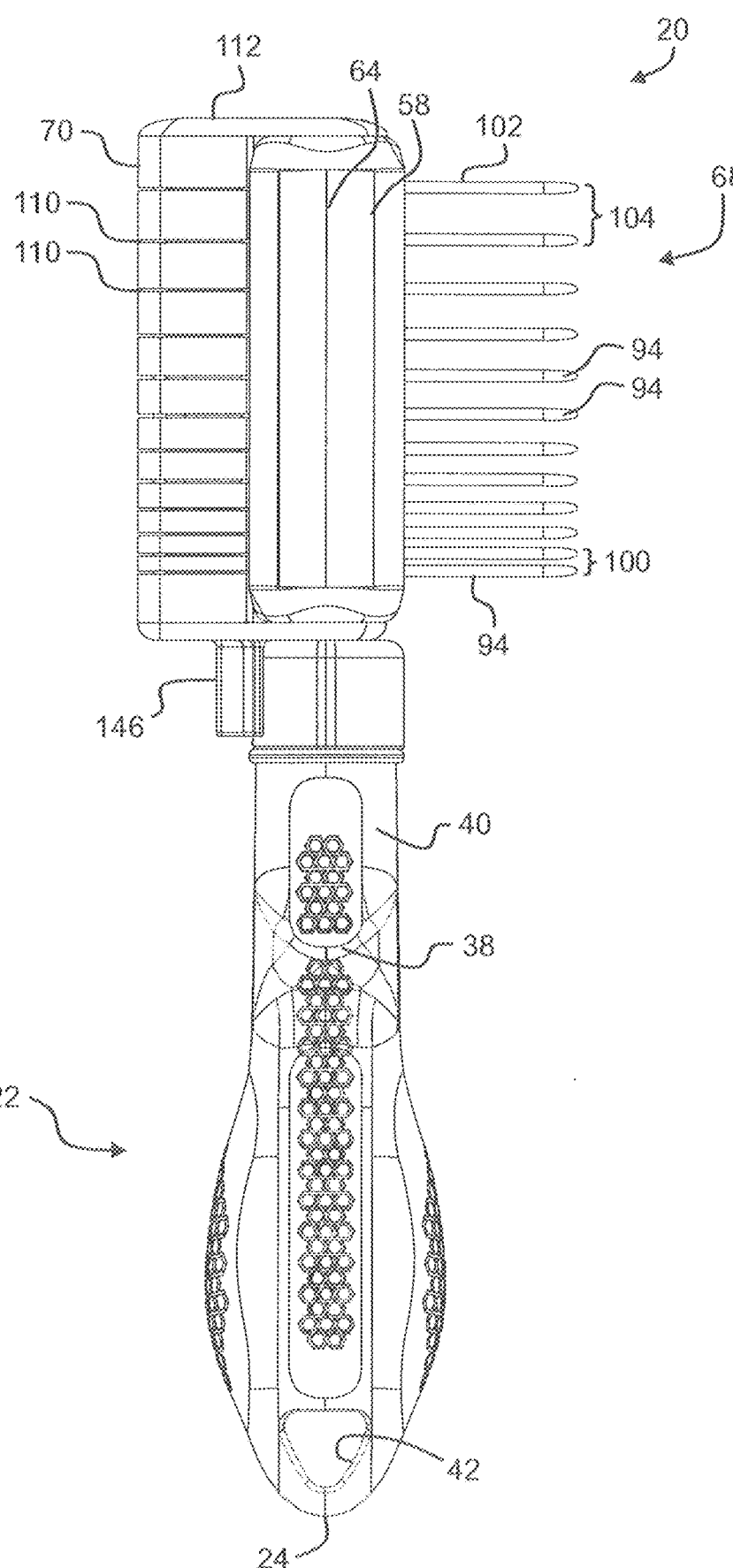
FIG. 6 is a bottom plan view of the grooming tool of FIG. 1.
Figure 7:
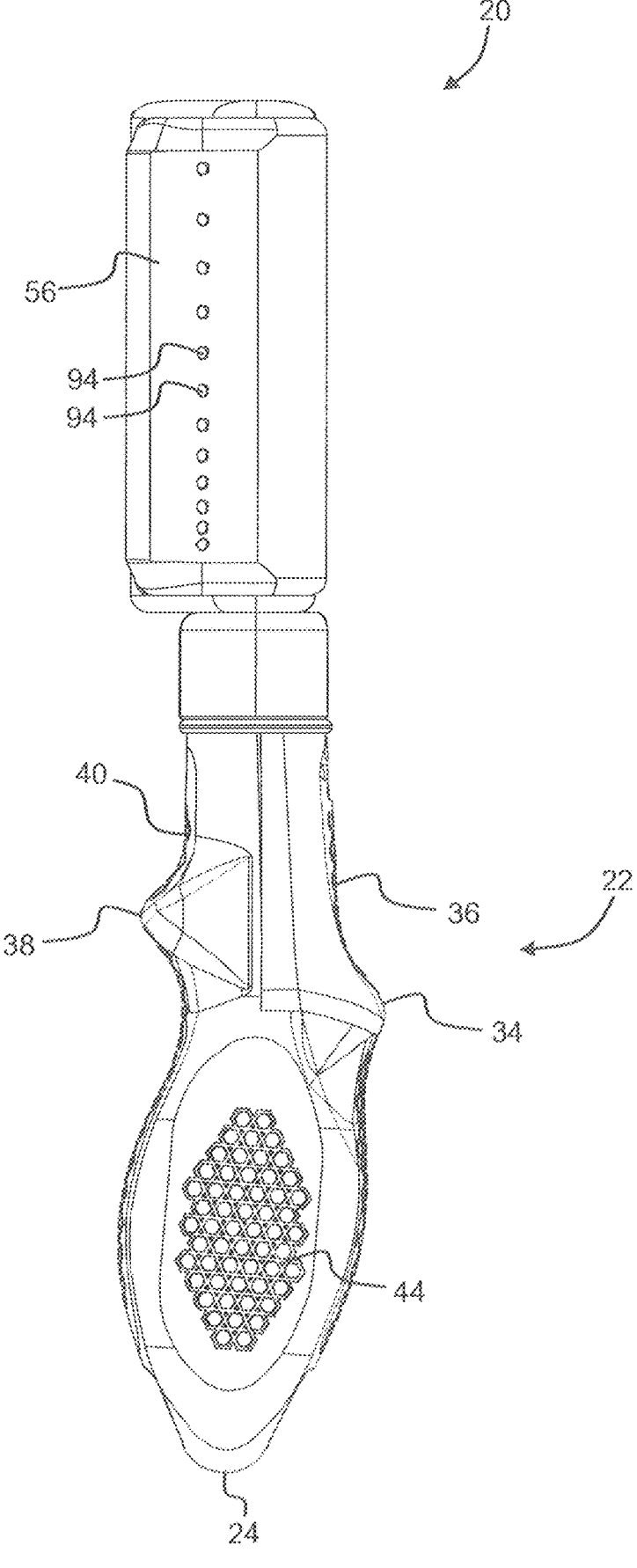
FIG. 7 is a left side view of the grooming tool of FIG. 1.
Figure 8:
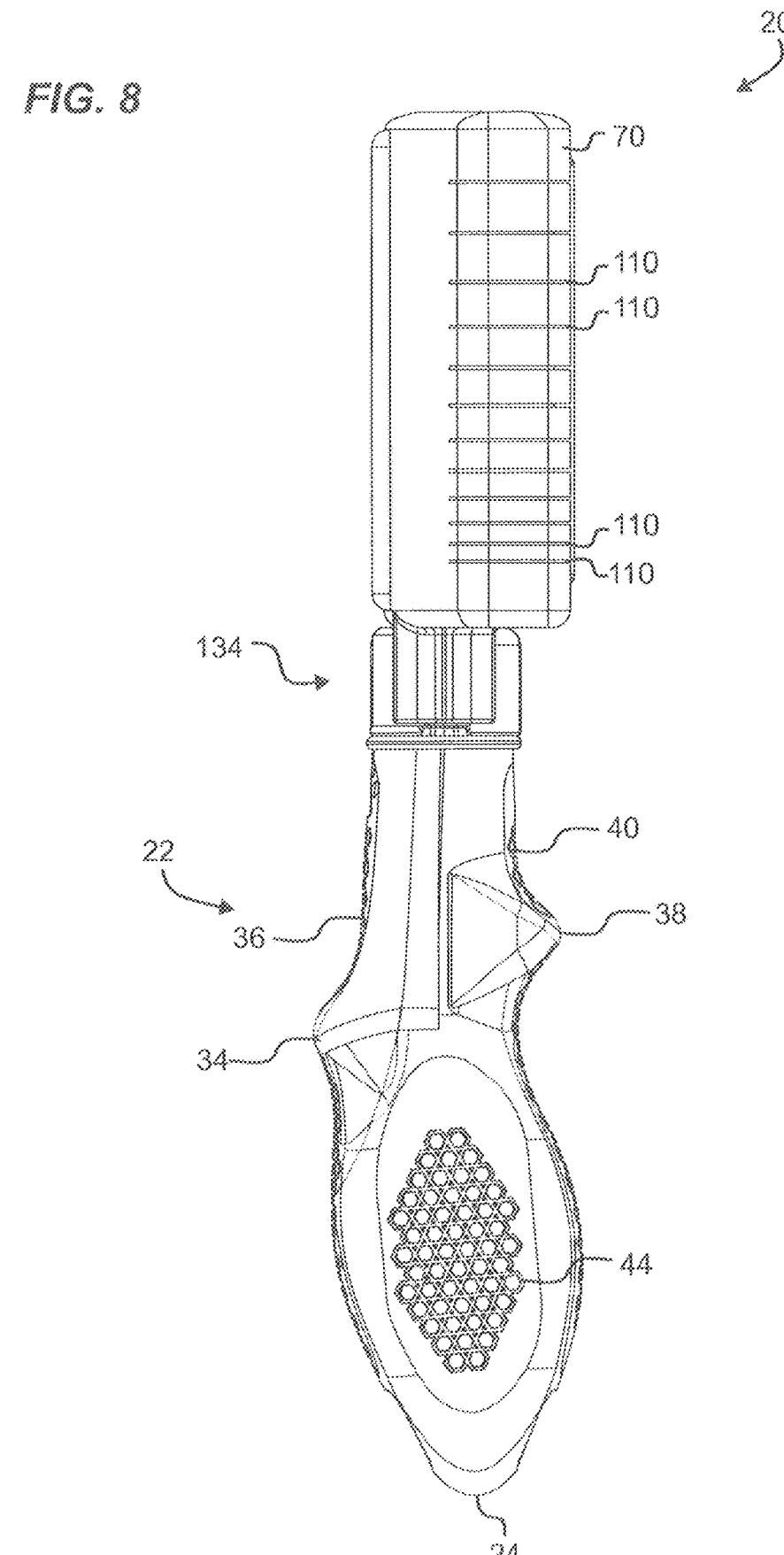
FIG. 8 is a right side view of the grooming tool of FIG. 1.
Figure 9:
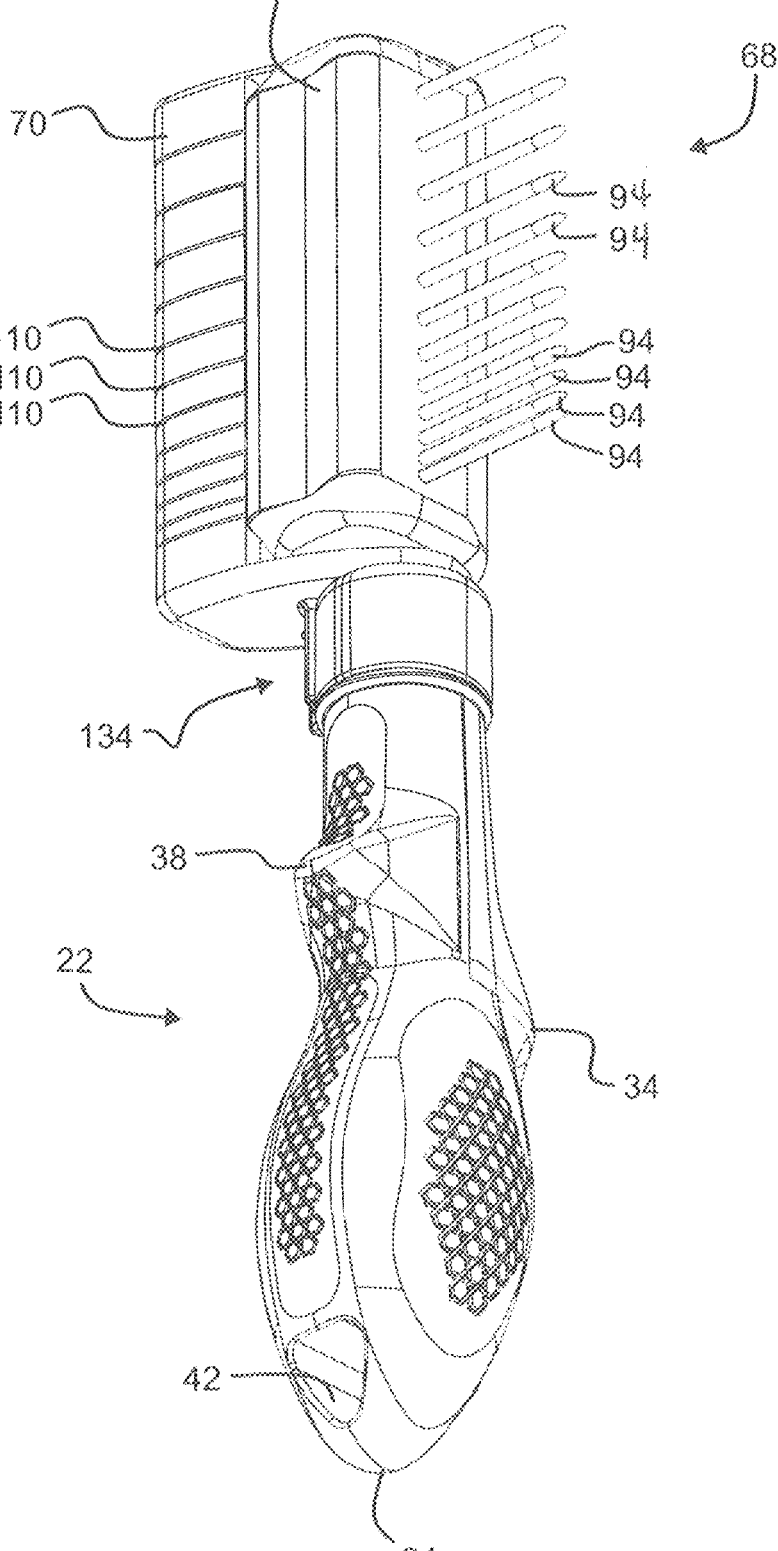
FIG. 9 is another perspective view of the grooming tool of FIG. 1.
Figure 10:
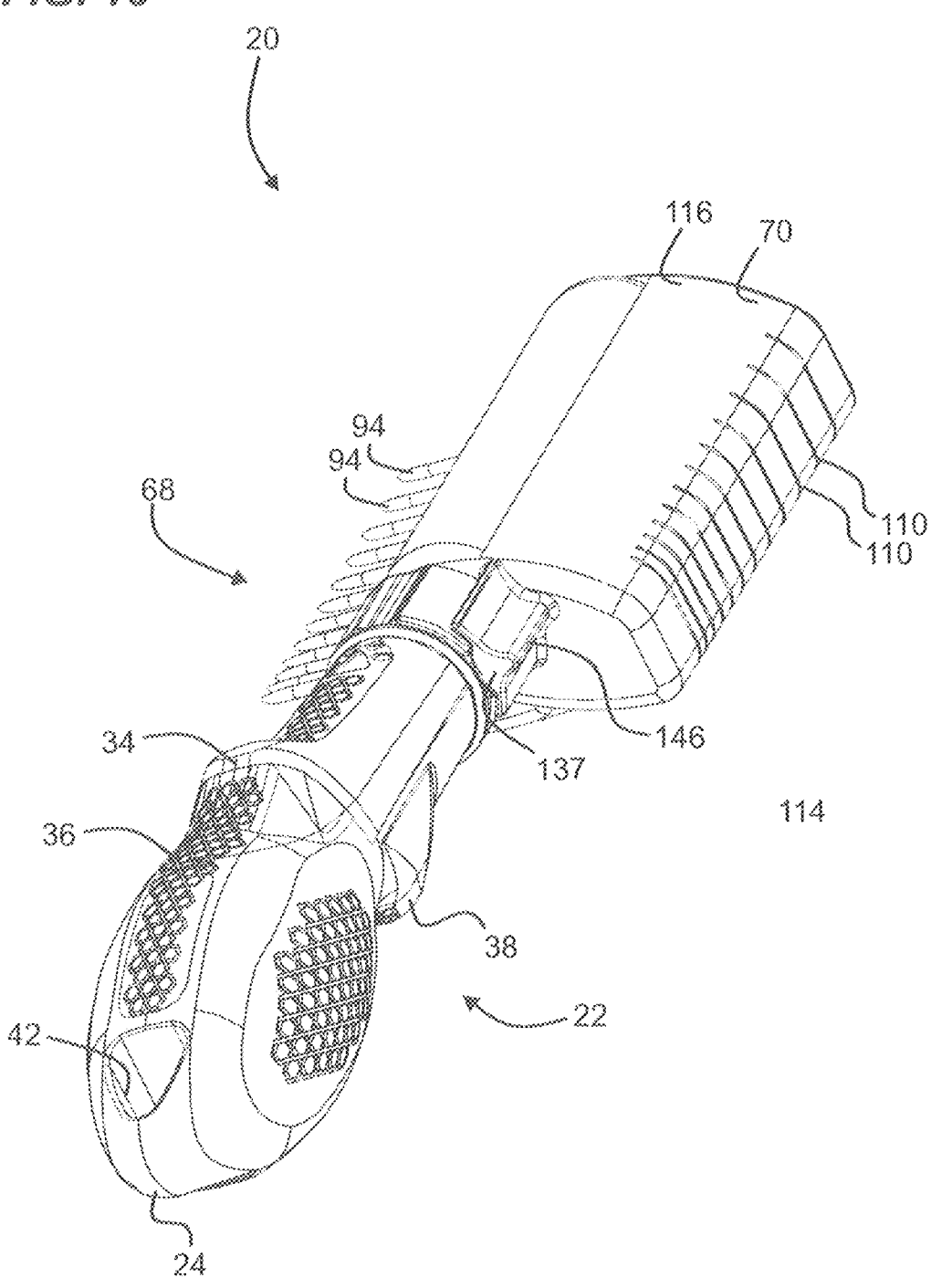
FIG. 10 is another perspective view of the grooming tool of FIG. 1.
Figure 11:
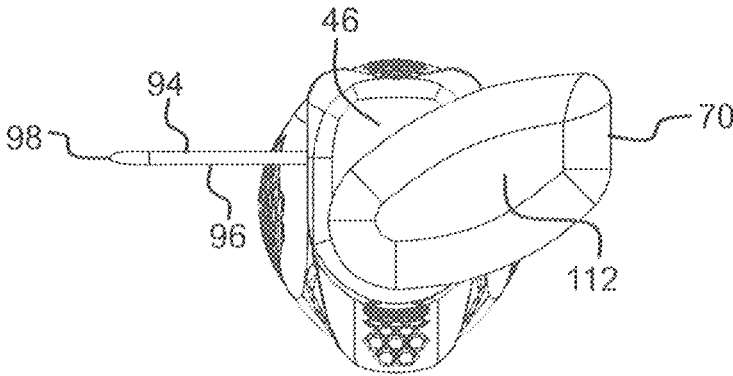
FIG. 11 is a front end view of the grooming tool of FIG. 1.
Figure 12:
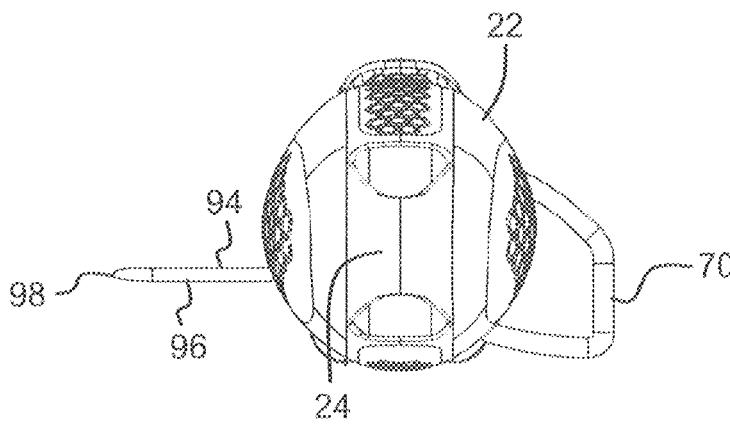
FIG. 12 is a rear end view of the grooming tool of FIG. 1.

In reference now to FIG. 6, the comb tines 94 are arranged in a manner to be able to address various thicknesses or lengths of hair or fur. This function is achieved by having the comb tines 94 spaced apart from each other at non-uniform distances. In the example shown, a closest space 100 between the comb tines 94 is closest to the handle 22. The spacing between the tines 94 incrementally increases to a last 102 of the comb tines 94, with a largest space 104, adjacent a terminal end/free end 50 of the head 46, remote from the handle 22. Variations are possible, including groups of three or several of the tines 94 having a same spacing, with other groups of three or several of the tines 94 having a same spacing but different from other groups of tines 94.

There can be a variety of numbers of comb tines 94. For example, there can be at least 8, or at least 10; no greater than 30, or no greater than 20. In many cases, there are between 10-15 comb tines 94. In the example shown, there are 12 comb tines 94.

The cover member 70 includes a plurality of slots 110, which are positioned and sized to receive the dematting teeth 72. As such, when the cover member 70 pivots from the open position to the closed position, covering the first section 66, each of the teeth 72 is received within a respective one of the slots 110. This action will eject hair or fur collected between the teeth 72.

Attention is directed to FIG. 13, which depicts a preferred embodiment of the cover member 70. The cover member 70 has a pair of end walls 112, 114 at opposite ends of the cover member 70. A wall section 116 extends between the end walls 112, 114. The wall section 116 forms an enclosure 118 for covering the teeth 72. The wall section 116, in the example shown, is curved having a cross-section in a general J-shape, with a pair of free end rims 120, 122. The wall section defines an opening 124, between the end rims 120, 122, which allows the teeth 72 to be selectively covered and uncovered by the cover member 70.

The wall section 116 has the slots 110, along the wall section 116 between the end wall 112 and end wall 114. Each of the slots 110 is generally parallel to the end walls 112, 114. Each of the slots 110 is an open slot, being open at the end rim 120 and extending along the wall section 116, but only partially and ending at a closed slot end 123 before reaching end rim 122. Each slot 110 has a width sized to receive one of the dematting teeth 72, so that the plate 74 is generally parallel to and sandwiched between opposite sides of each slot 110.

The slots 110 have the same non-uniform spacing between them as the dematting teeth 72. As such, a closest space 126 between the slots 110 is closest to the handle 22. The spacing between the slots 110 incrementally increases to a last 128 of the slots 110, with a largest space 130, adjacent the end wall 112, remote from the handle 22.

The end wall 114 includes an aperture 132 passing therethrough. The aperture 132 may be provided to accommodate a fastener to pivotally connect the cover member 70 to the handle 22.

In some implementations, when the cover member 70 moves from the open (uncovered) position, to the closed (covered) position covering the first section 66, as the slots 110 slide around each of the dematting teeth 72, hair or fur in the teeth 72 may be ejected or pushed away from the head 46. As such, when the cover member 70 pivots to a position covering the first section 66, the cover member 70 removes hair or fur from the first section 66.

In accordance with principles of this disclosure, the grooming tool 20 has a locking mechanism 134. The locking mechanism 134 selectively locks and unlocks the cover member 70 in one of the closed position, covering the first section 66, or an open position, uncovering or exposing the first section 66.

While a variety of implementations are possible, in the example shown, the locking mechanism 134 illustrated includes a first sliding lock member 136. The first sliding lock member 136 is on the cover member 70. For example, the first sliding lock member 136 projects from a portion of the cover member 70, such as from the end wall 114 of the cover member 70.

Figure 15:
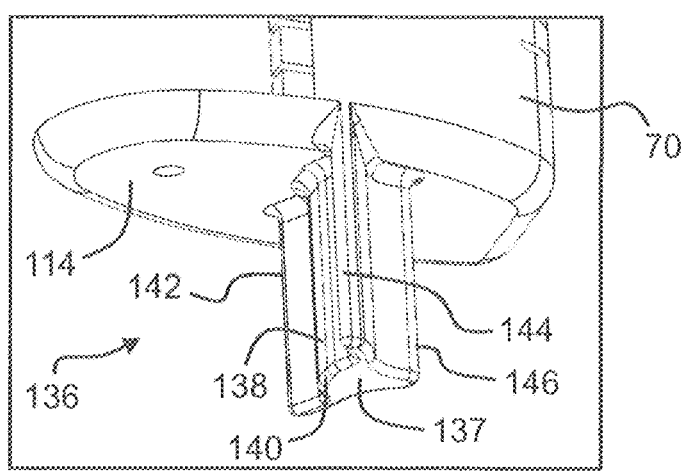
FIG. 15 is an enlarged, perspective view of a first member of a lock mechanism on the head of the grooming tool of FIG. 1.

FIG. 15 illustrates an enlarged, perspective view of the first sliding lock member 136. The first sliding lock member 136 is on a stem 137 extending from the cover member 70.

The stem 137 includes a lobe 138, in the form of a rounded projection 140. The stem 137 has a pair of ribs 142, 144 on each side of the lobe 138. A third rib 146 extends along the stem 137 on an opposite side of the lobe 138. The ribs 142, 144, 146 can assist with being gripping portions, or handles, to help move the first sliding lock member 136.

The locking mechanism 134 further includes a second lock member 150 (FIG. 16). The second lock member 150 includes a recess arrangement 152 in the handle 22. For example, the recess arrangement 152 includes at least first and second recesses 154, 156 along the sides of the handle 22 of the head engaging end 26. The recesses 154, 156 are sized to receive the first sliding lock member 136. For example, the recesses 154, 156 receive the rounded projection 140 of the lobe 138. The recesses 154, 156 are embodied here as smooth, curved indented surfaces.

In use, when the cover member 70 is in the closed (covered) position, the lobe 138 of the first sliding lock member 136 is positioned in the recess 154. When the cover member 70 is moved to the open (uncovered) position, the first sliding lock member 136 is moved by the user's thumb or fingers by grasping one or more of the ribs 142, 144, 146, to slide the first sliding lock member 136 and position the lobe 138 in the second recess 156. To move the cover member 70 back to the closed (covered) position, the actions are reversed—the first sliding lock member 136 is slid to position the lobe 138 in the first recess 154.

Example Methods of Use

In operation, the grooming tool 20 can be used to groom an animal, such as a dog. The method includes a step of dematting hair or fur on an animal. This step includes pivoting the cover member 70 on the grooming tool 20 to uncover the plurality of spaced, dematting teeth 72 on the head 46 of the grooming tool 20. This step includes using the dematting teeth 72 to remove matted hair or fur.

The method also includes combing hair on the animal by using the plurality of spaced comb tines 94 on the head 46. The comb tines 94 extend in a direction opposite from the dematting teeth 72.

The method further includes holding the handle 22 attached to the head 46. The handle 22 has handle longitudinal axis 28, such that a human hand wraps around the handle longitudinal axis 28 while holding. The head 46 has head longitudinal axis 52 co-linear with or parallel to the handle longitudinal axis 28.

The method further includes a step of removing hair from the dematting teeth 72 by pivoting the cover member 70 to a position covering the dematting teeth 72. In some examples, this can include moving the cover member 70 from the open (uncovered) position, to the closed (covered) position covering the first section 66, and sliding the slots 110 slide around each of the dematting teeth 72, to push or eject hair or fur in the teeth 72 away from the head 46.

The method can further include a step of locking the cover member 70 in the closed position, covering the dematting teeth 72. This step may include moving or sliding the first sliding lock member 136 to position the lobe 138 in the first recess 154 of the second lock member 150.

The method may also further include a step of positioning a thumb in the groove 64 extending a complete length of the head 46 and located in the side 58 between the dematting teeth 72 and the comb tines 94.

The method can also include using the dematting teeth 72 and comb tines 94, when the dematting teeth 72 are spaced from each other at non-uniform distances, with closest space 90 between the dematting teeth 72 being closest to the handle 22, and the spacing incrementally increasing to the last 91 of the dematting teeth 72 adjacent terminal end 50 of the head 46, remote from the handle 22. The comb tines 94 are spaced from each other at non-uniform distances, with the closest space 100 between the comb tines 94 being closest to the handle 22, and the spacing incrementally increasing to the last 102 of the comb tines 94 adjacent the terminal end 50 of the head 46, remote from the handle 22.

The grooming tool 20 is used on poodles, poodle-crosses (doodles), and other dogs or animals. The variable spacing of the teeth 72 and tines 94 is useful in handling the various lengths and thicknesses of the hair/fur. The thumb rest groove 64 is helpful to the user is proving leverage to the grooming process. The movable cover member 70 is convenient to cover the dematting teeth 72, to protect them from damage and to prevent injury to the user. The cover member 70 also helps to eject the fur from the teeth 72.

Further Example Embodiment, FIGS. 17-36

FIGS. 17-36 show another embodiment of a grooming tool 200.

Figure 21:
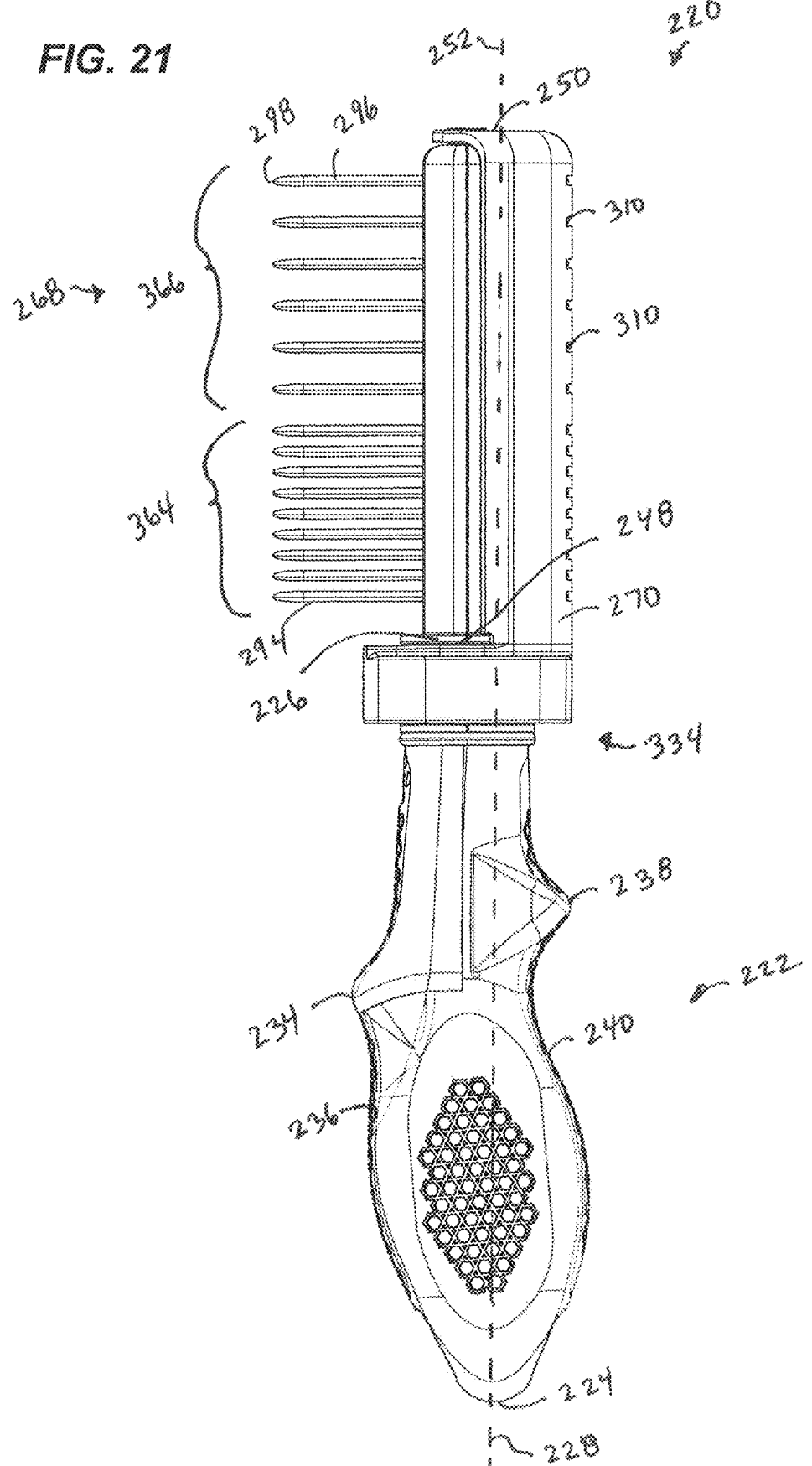
FIG. 21 is a top plan view of the grooming tool of FIG. 17.
Figure 22:
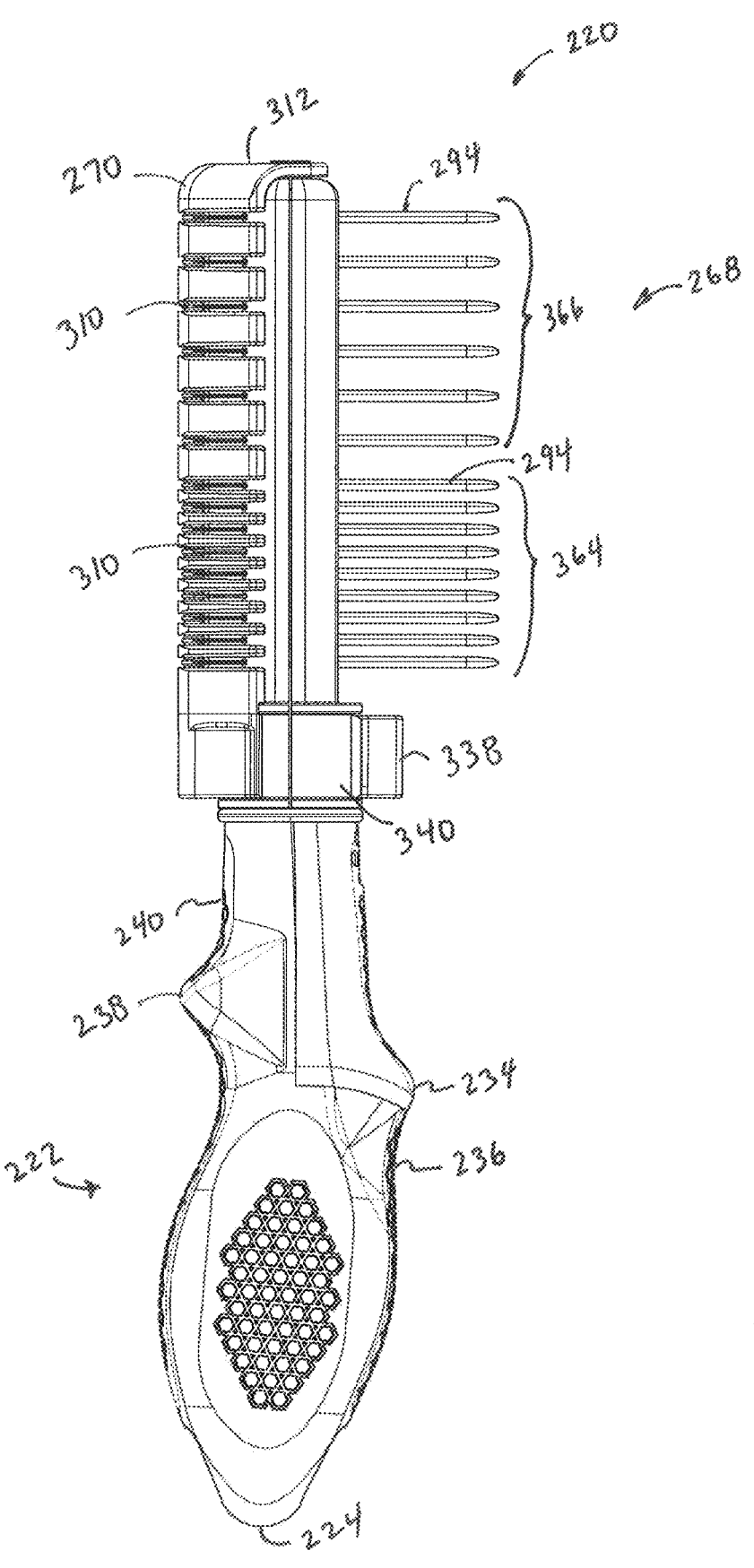
FIG. 22 is a bottom plan view of the grooming tool of FIG. 17.
Figure 23:
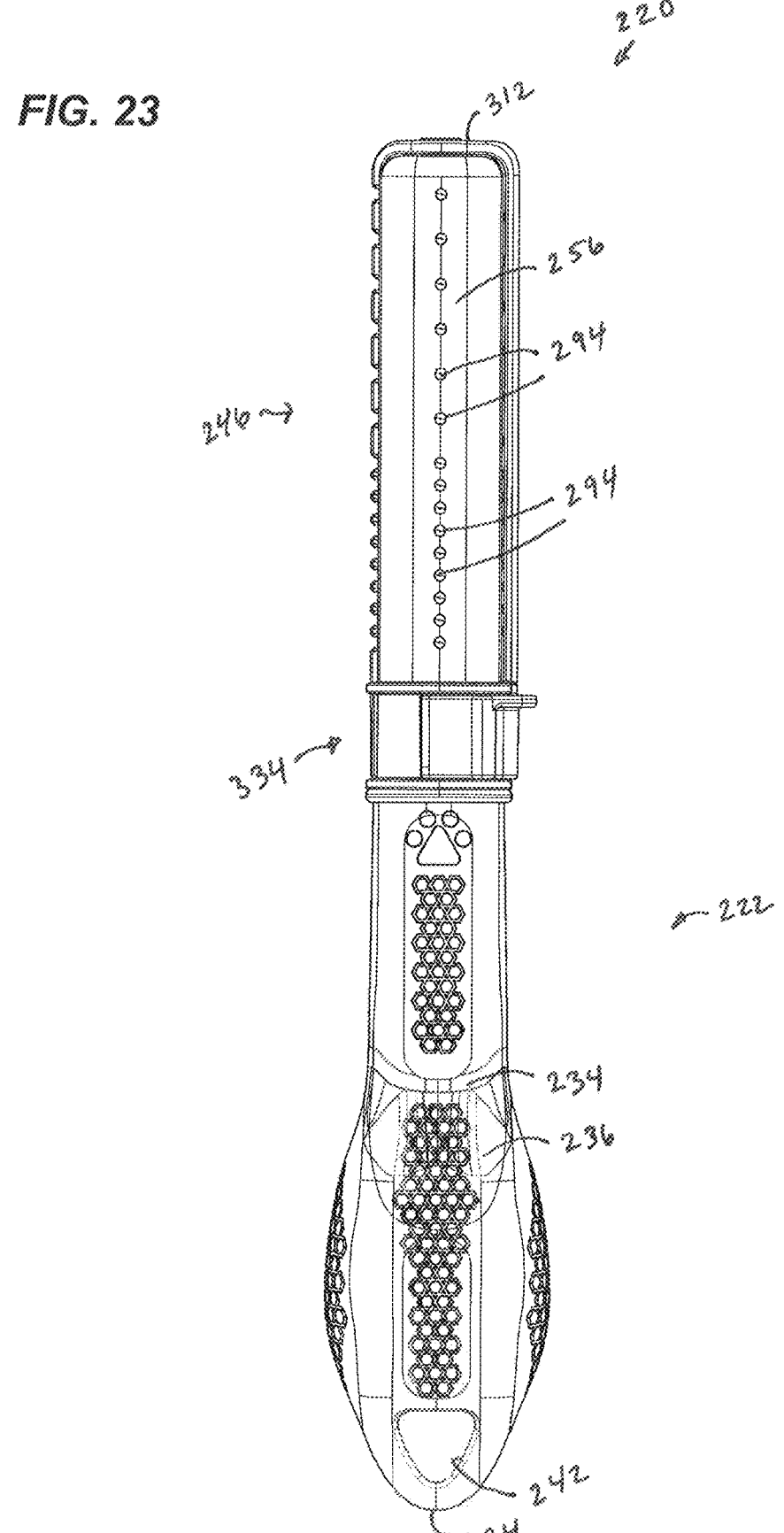
FIG. 23 is a left side view of the grooming tool of FIG. 17.
Figure 24:
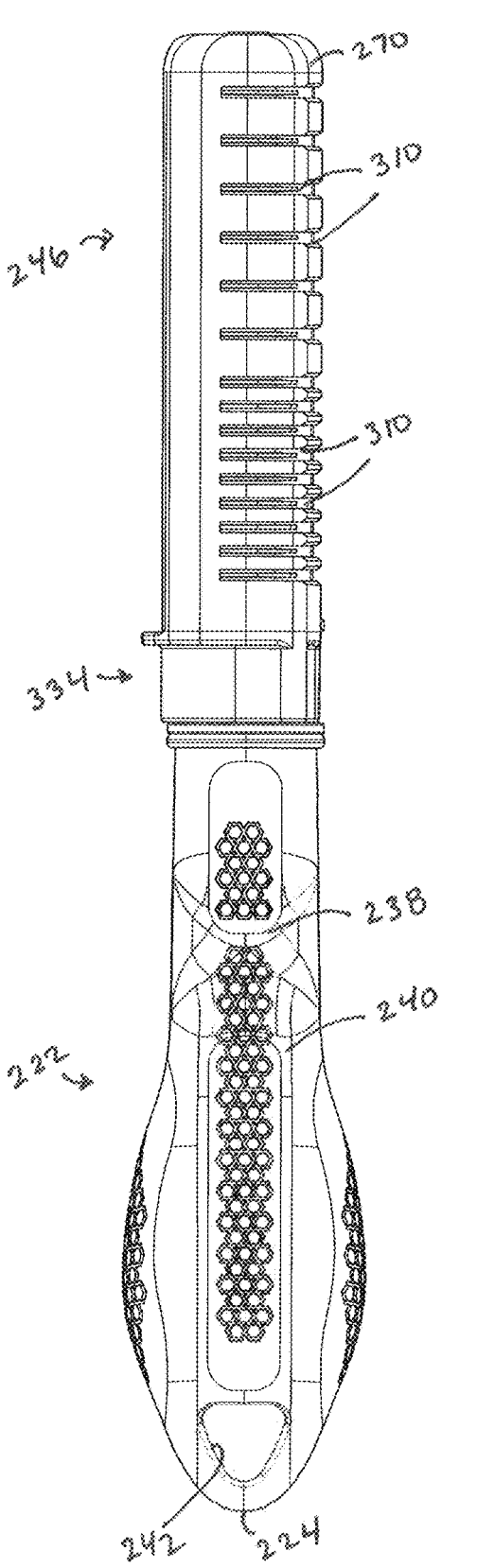
FIG. 24 is a right side view of the grooming tool of FIG. 17.
Figure 25:
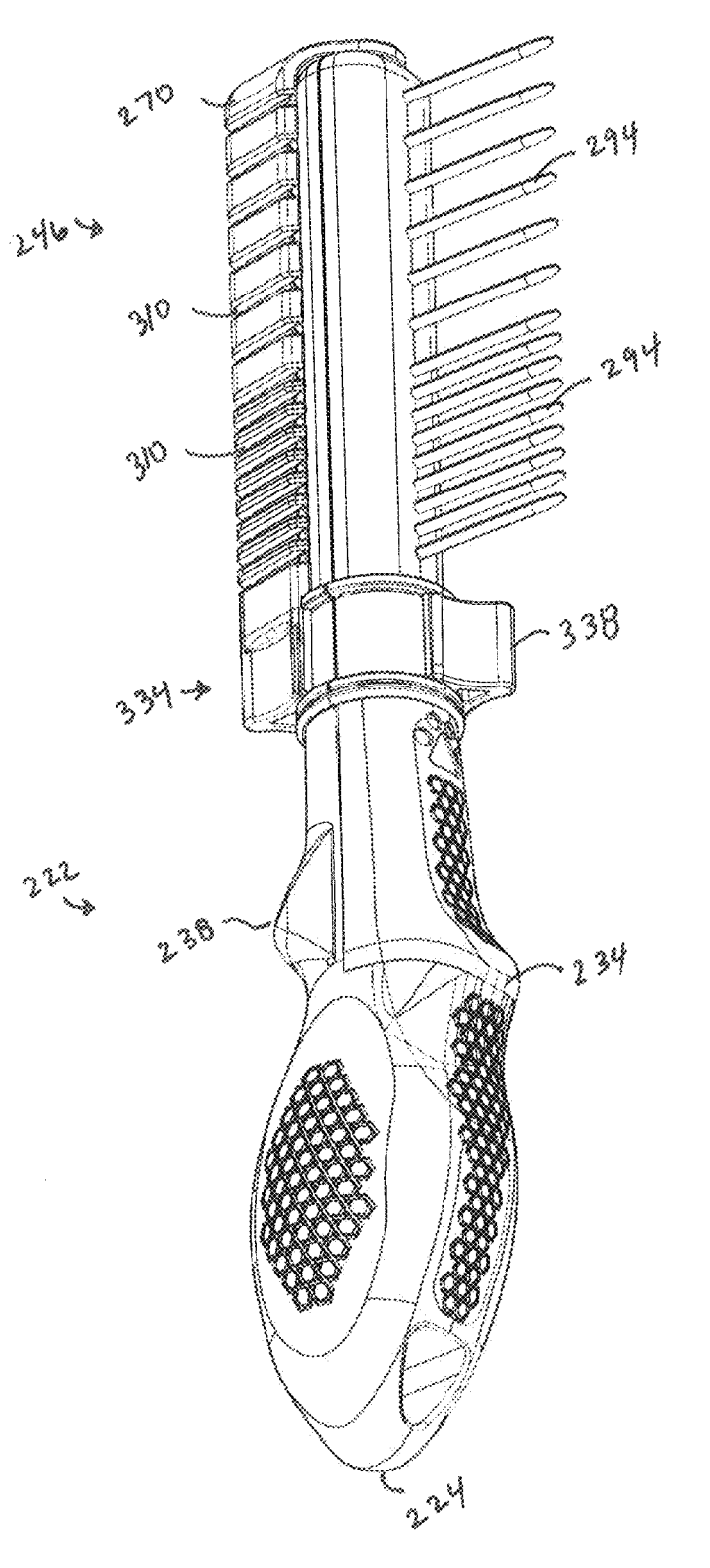
FIG. 25 is another perspective view of the grooming tool of FIG. 17.
Figure 26:
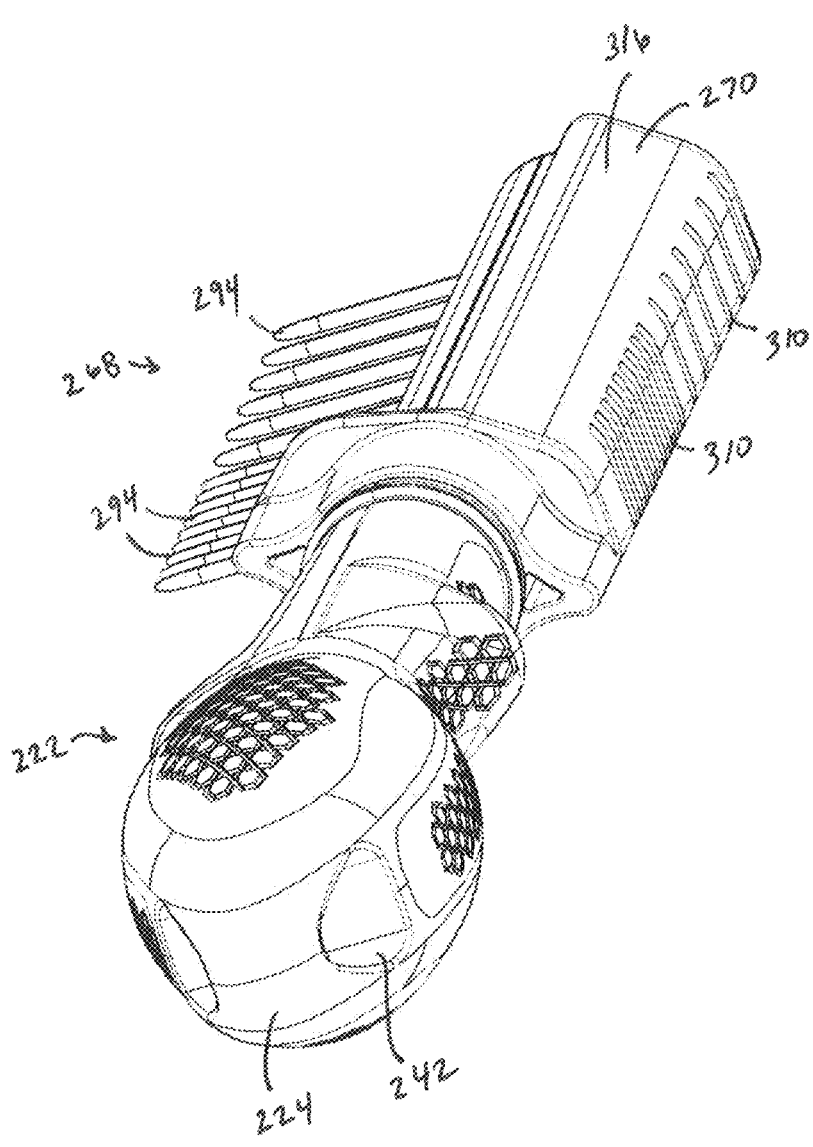
FIG. 26 is another perspective view of the grooming tool of FIG. 17.

The tool 220 includes a handle 222. The handle 222 is sized and configured for being grasped by a human hand, such that a thumb is on one side of the handle 222, with the remaining fingers wrapped around the handle 222 and resting on an opposite side of the handle 222. Referring to FIG. 21, the handle 222 has a free end 224. A handle longitudinal axis 228 extends between the free end 224 and an opposite end 226. When held by a human hand, the hand wraps around the handle longitudinal axis 228.

Figure 20:
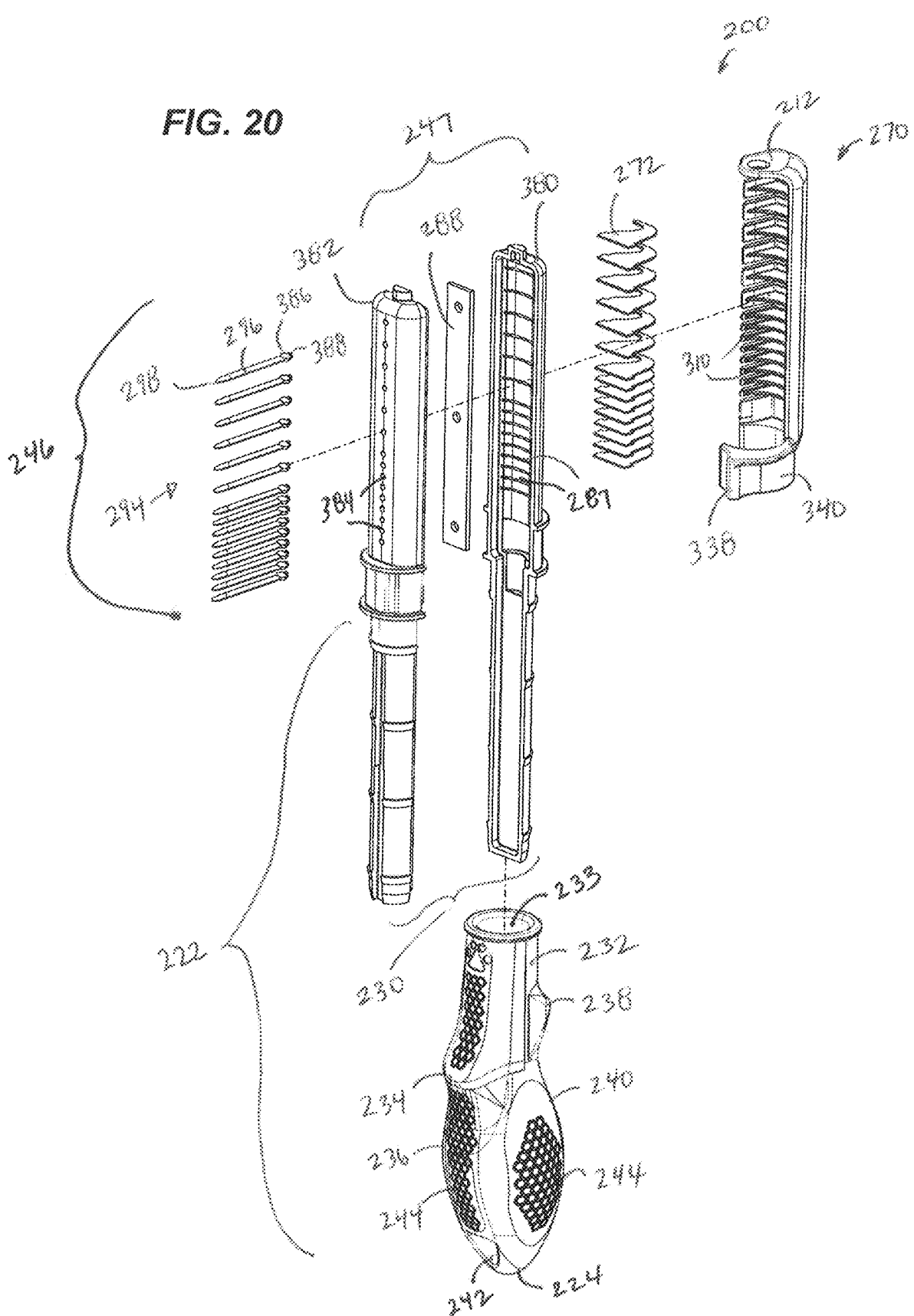
FIG. 20 is an exploded, perspective view of the grooming tool of FIG. 17.

FIG. 20 shows an exploded view of the tool 220. The tool 220 includes a head 246. The head 246 extends from the handle 222. The tool 220 also comprises a body 247 including a handle core 230 and the head 246. The handle core 230 is covered by a handle cover 232. Together, the handle core 230 and handle cover 232 defining the handle 222. The handle cover 232 has an interior 233, which receives the handle core 230.

In the particular example shown in FIG. 20, the body 247 has a first body piece 380 and a second body piece 382. A back plate 288 is secured to the second body piece 382 and held between the first body piece 380 and the second body piece 382 in the head 246. The first and second body pieces 380, 382 are secured together to form the body 247.

Preferably, the handle cover 32 includes optional ergonomic features to make the tool 220 convenient and easy to use. The handle 222 has a thumb rest 234. The thumb rest 234 is on a first side 236 of the handle cover 232 positioned for resting a thumb during use. The handle 222 also preferably has a finger rest 238. The finger rest 238 is on a second side 240, opposite of (that is, 180° from) the first side 236 and from the thumb rest 234, for resting one or more of the remaining fingers (index finger, for example).

The handle 222 further has an optional through hang hole 242 adjacent the free end 224. The handle cover 232 has optional texturing 244 for making the handle 222 easier for gripping.

Figure 34:
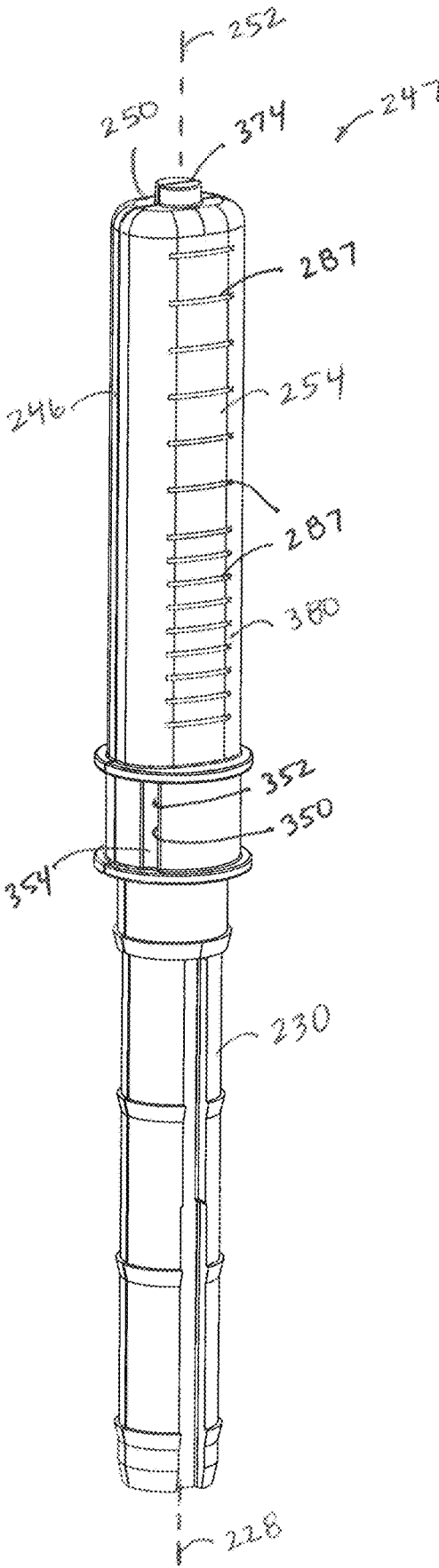
FIG. 34 is perspective view of a body used in the grooming tool of FIG. 17.
Figure 35:
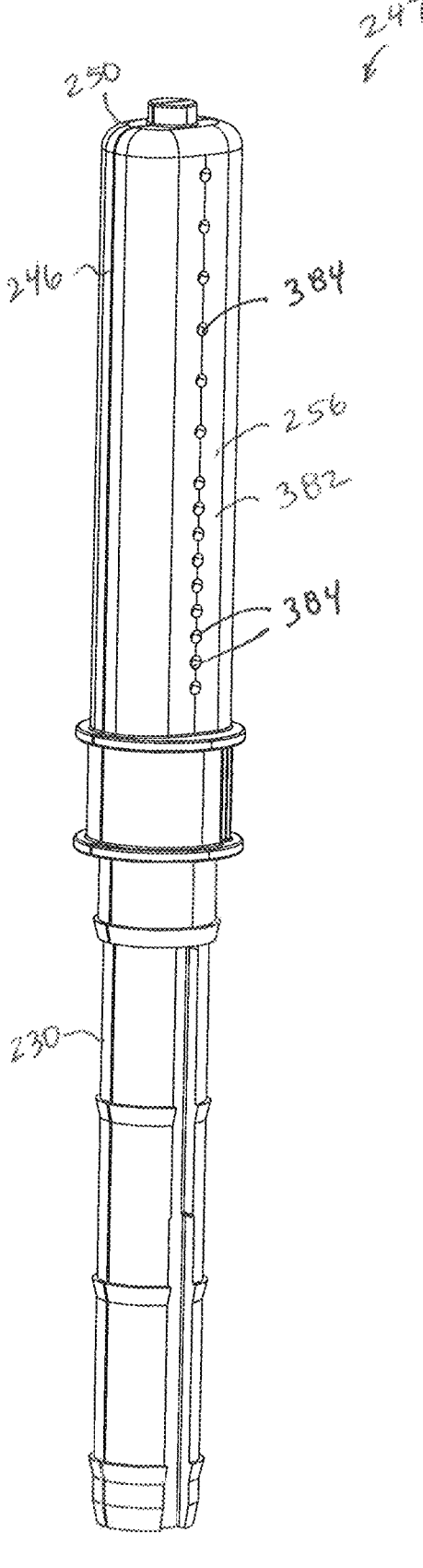
FIG. 35 is another perspective view of the body of FIG. 34.
Figure 36:
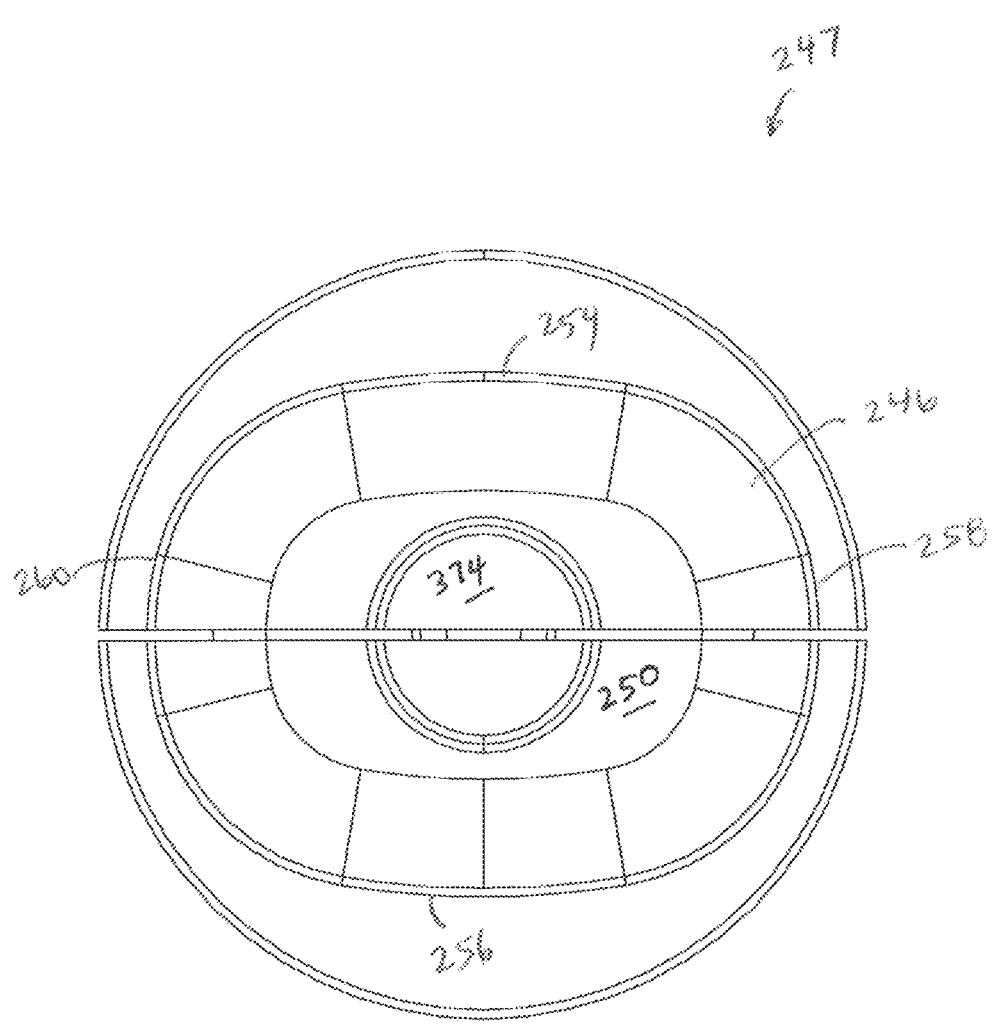
FIG. 36 is a top view of the body of FIGS. 34 and 35.

Referring to FIGS. 34 and 35, the head 246 has a free end 250, which is also a free end of the body 247. The head 246 has a head longitudinal axis 252 passing through the free end 250 and extending through the handle core 230 and free end 224 of the handle 222. As such, the head longitudinal axis 252 is preferably co-linear with the handle longitudinal axis 228.

The head 246 can be a variety of shapes. In the example embodiment shown and in reference to FIGS. 34-36, the head 246 has a cross-section with a parallel first side 254 and second side 256, joined by opposite third and fourth sides 258, 260. In the example shown, the third side 258 and fourth side 260 each has a curved face 261, 262.

In accordance with principles of this disclosure, the grooming tool 220 has a first section 266 of a first grooming characteristic. By "grooming characteristic", it is meant a grooming function and/or a size. That is, there are various types of grooming functions, depending on what is desired to be accomplished by the grooming. Types of grooming characteristics, i.e. grooming functions, include: deshedding (removing loose, dead undercoat); dematting to remove mats; pin brushes to fluff detangled or wiry coats; bristle brushes as finishing tools to distribute natural oils and add shine; slicker brushes to detangle and remove lighter mats; rubber curry combs for massaging skin; and various types of combs for detangling, dematting, or fluffing. Size differences can include density (such as bristle or tooth density) and/or length of bristles/teeth.

Figure 33:
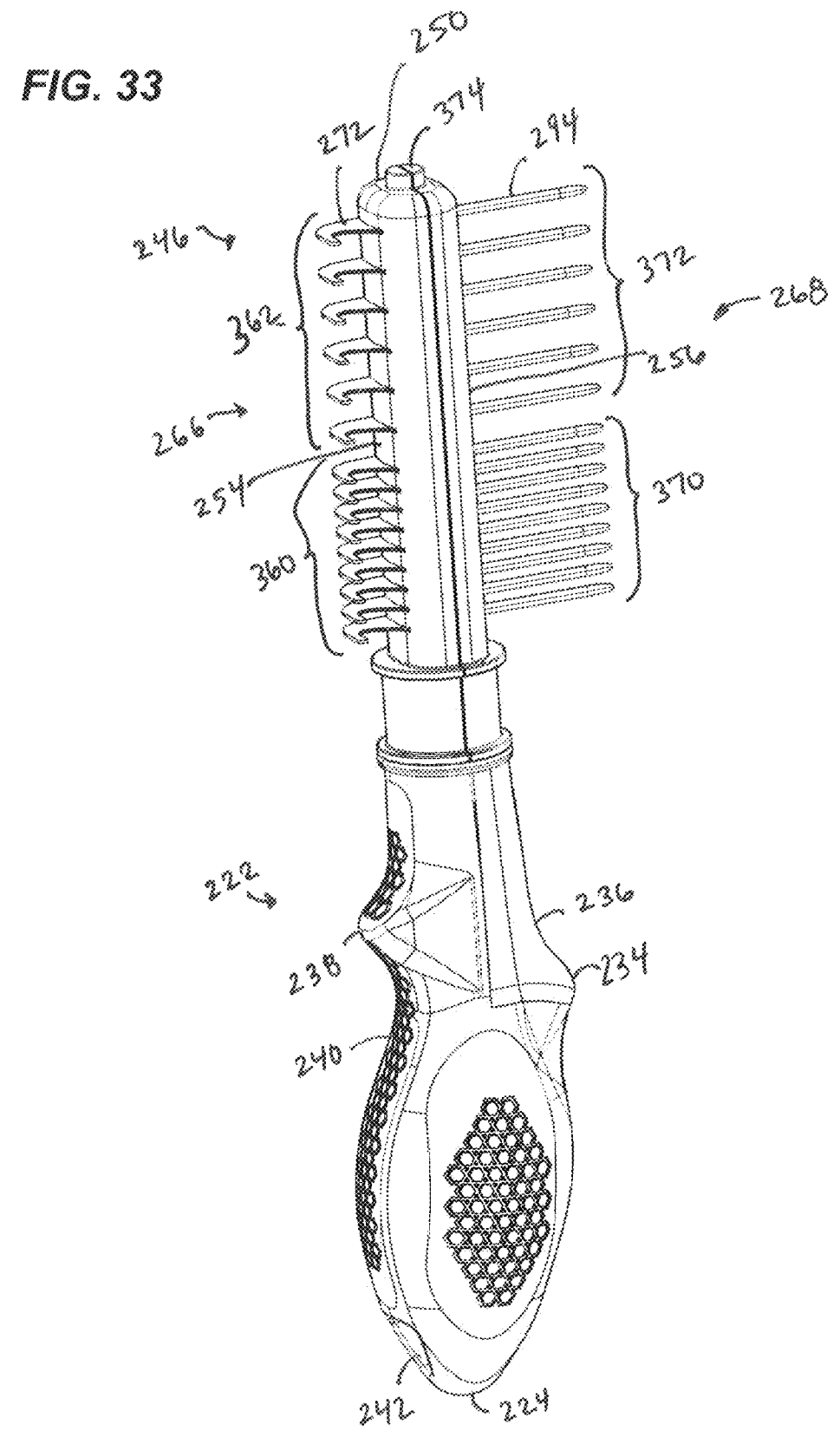
FIG. 33 is a perspective view of the grooming tool of FIG. 17, with the cover removed to further understanding of the construction.

The first section 266 having first grooming characteristic extends from the head 46 in a first direction, perpendicular to the head longitudinal axis. In the example of FIG. 33, the first grooming characteristic extends from the first side 254 of the head 246 in a direction perpendicular to the head longitudinal axis 252.

In accordance with principles of this disclosure, the grooming tool 220 has a second section 268 of a second grooming characteristic. The second grooming characteristic is different from the first grooming characteristic. By "different", it is meant that the second grooming characteristic has a grooming function and/or size that is not identical to the first grooming characteristic. The second section 268 extends from the head 246 in a second direction perpendicular to the head longitudinal axis 252, and the second direction is different from the first direction. In the example of FIG. 33, the second section 268 extends from the second side 256 of the head 246 and in a direction perpendicular to the head longitudinal axis 252.

The second section 268 extends from the second side 256 of the head 246 and in a direction perpendicular to the head longitudinal axis 252.

Preferably, the second direction is opposite of the first direction, such that the first section 266 and second section 268 are 180° apart, extending in opposite directions. For example, the second side 256 of the head 246 is opposite of the first side 254 of the head 246, such that the first section 266 and second section 268 are 180° apart, extending in opposite directions from each other.

The grooming tool 220 is designed with ergonomic principles to allow for easy grooming and optimal hand leverage. As such and in reference to FIG. 23, in this embodiment, a base of the thumb rest 834 is located in a plane (along the first side 236 of the handle 222), which is aligned with the second section 268. Likewise, and in reference to FIG. 24, a base of the finger rest 238 is located in a plane (along the second side 240 of the handle 222), which is aligned with the first section 266. In other words, the thumb rest 234 projects from a first plane located along the first side 236 of the handle 222; the second section 268 projects from the first plane located along the second side 256 of the head 246; the finger rest 238 projects from a second plane located along the second side 240 of the handle 222; and the first section 266 projects from the second plane located along the first side 254 of the head 246. In preferred embodiments, the first plane is 180° relative to the second plane.

In accordance with principles of this disclosure, the grooming tool 220 has a cover member 270. The cover member 270 is positionable to selectively cover and uncover the first section 266.

Figure 17:
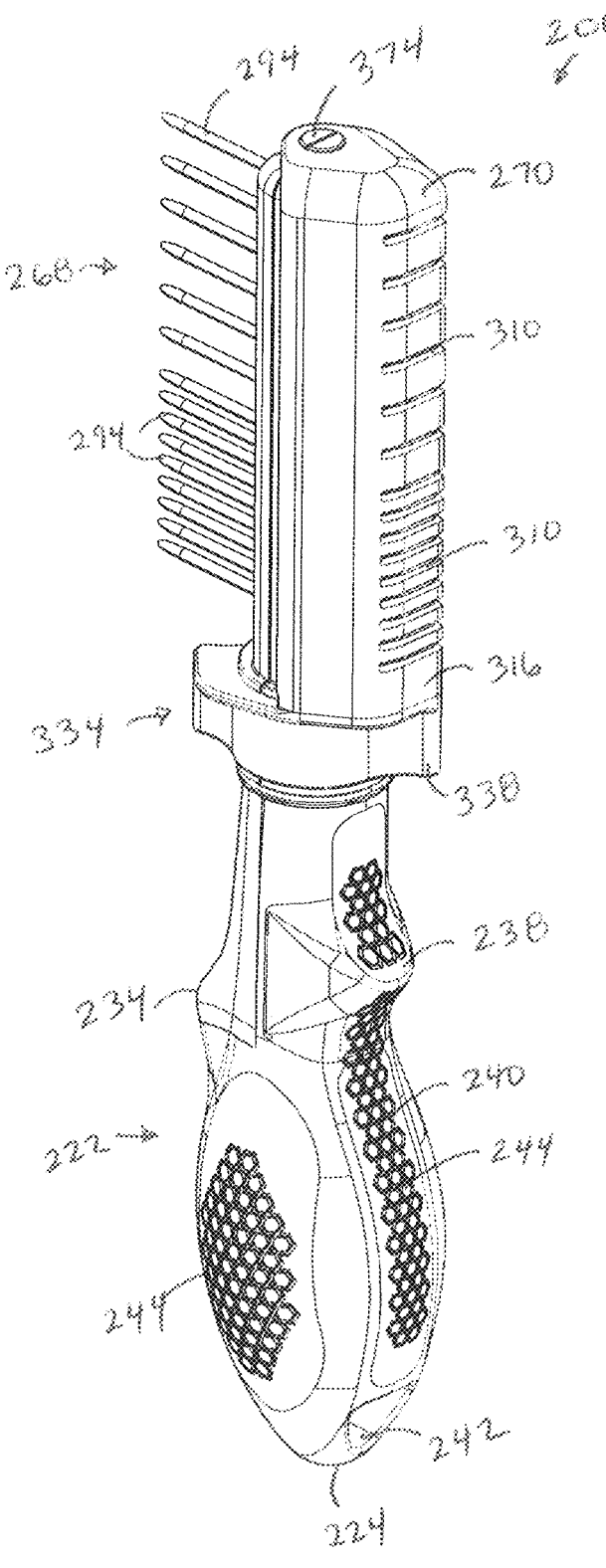
FIG. 17 is a perspective view of another embodiment of a grooming tool for an animal, showing a movable cover in a closed position.
Figure 18:
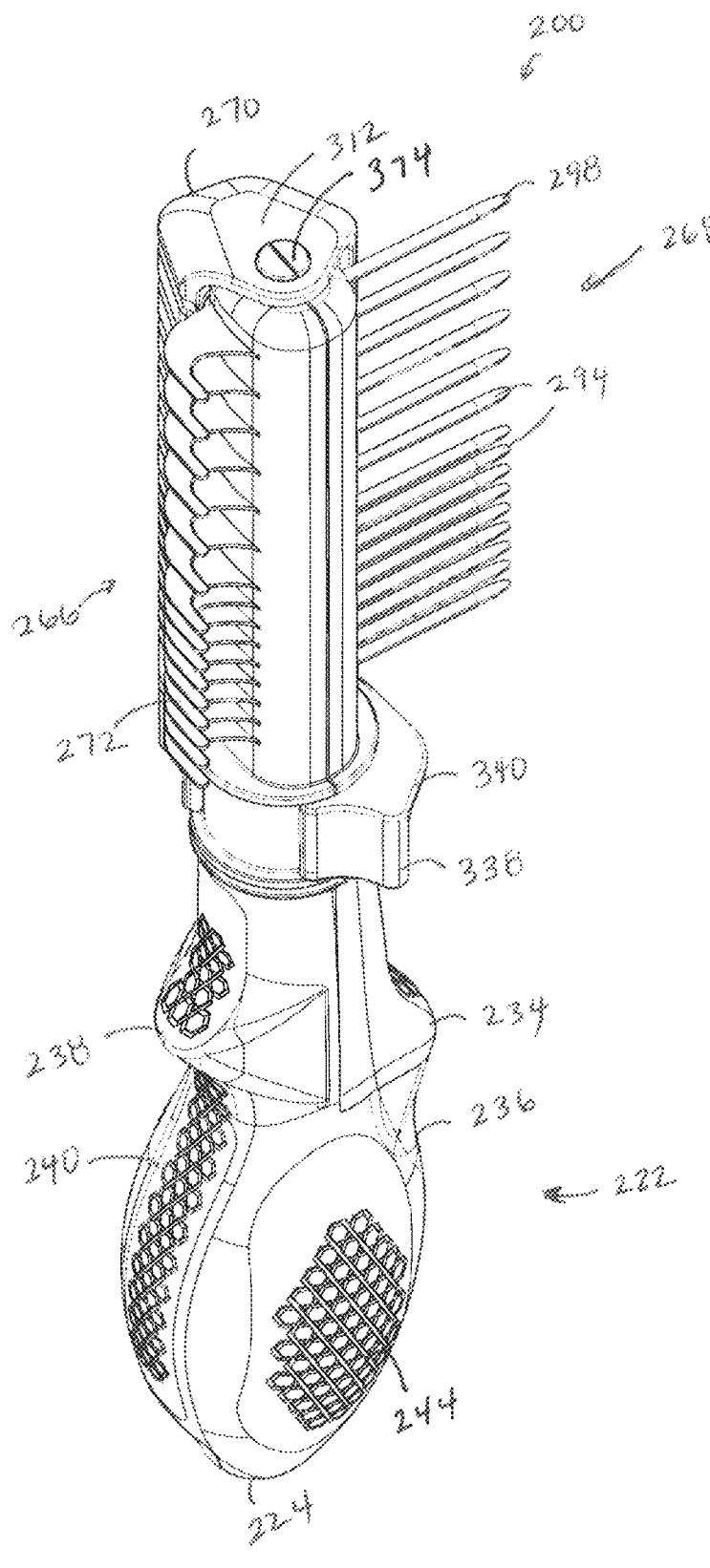
FIG. 18 is a perspective view of the grooming tool of FIG. 17, showing the cover in a partially open position.
Figure 19:
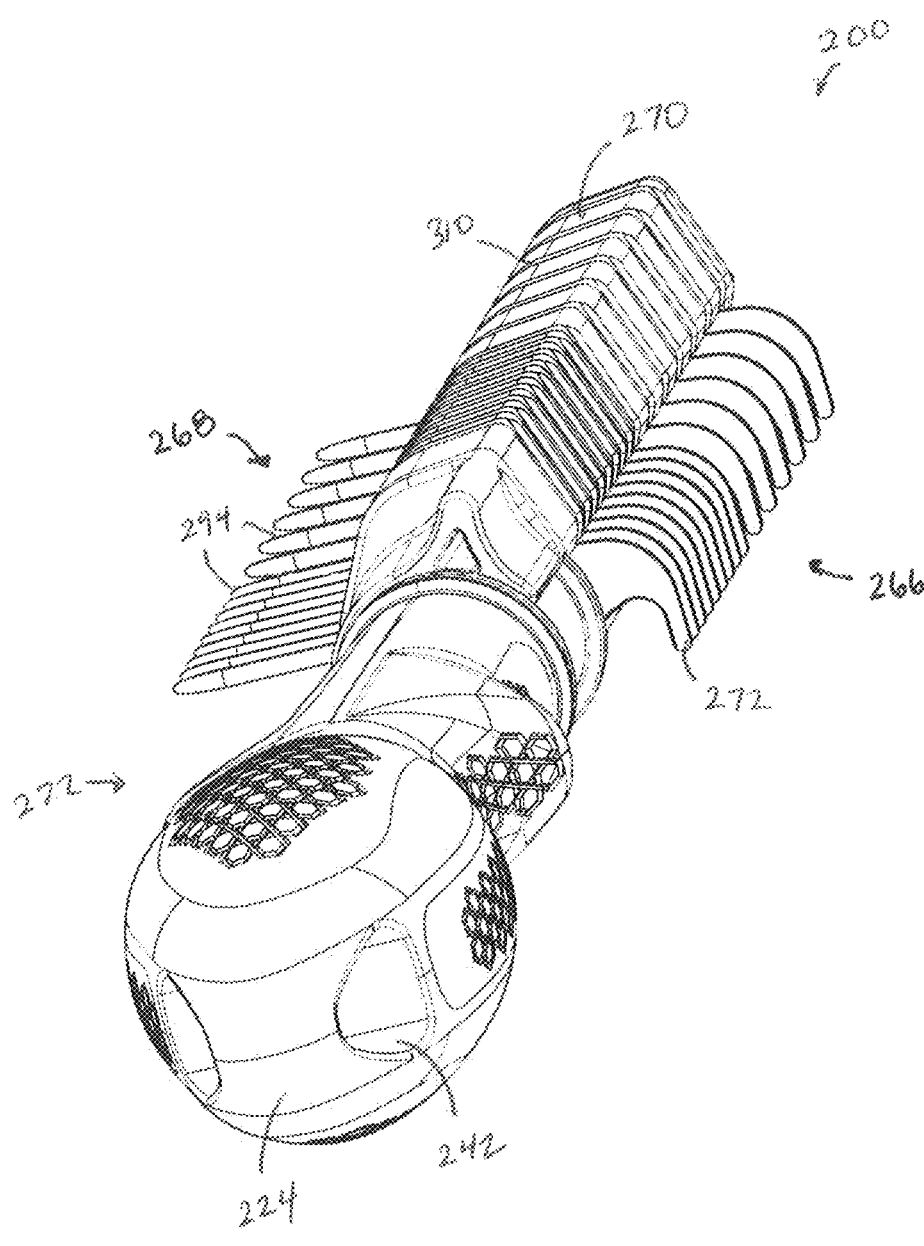
FIG. 19 is a perspective view of the grooming tool of FIG. 17, showing the cover in a fully open position.

In example embodiments, the cover member 270 is a movable cover member 270 pivotably attached to the head 246 and positionable to selectively cover and uncover the first section 266. In preferred implementations, the cover member 270 pivots about a pivot axis that is either co-linear with or generally parallel to the head longitudinal axis 252. FIG. 17 illustrates the cover member 270 in a closed position, covering the first section 266. FIG. 19 illustrates the cover member 270 in an open position, exposing for use, or uncovering the first section 266. FIG. 18 illustrates the cover member 270 between the closed position of FIG. 17 and open position of FIG. 19. More discussion of a preferred embodiment of the cover member 270 is below.

The first grooming characteristic of the first section 266 may be one of many. In the particular embodiment illustrated, the first grooming characteristic is dematting. By "dematting" it is meant a tool that removes matted hair or fur by one or both of cutting or combing.

In this embodiment, the first section 266 has a plurality of spaced dematting teeth 272. In reference now to FIG. 30, each of the dematting teeth 272 includes a plate 274. The plate 274 has a base 276 in contact with the head 246. Extending from the base 276 is a rear surface 278, shown here as straight, but could be other shapes. The plate 274 has a curved front surface 280, opposite of the rear surface 278. The plate 274 further includes a tine 282 at a terminal end 284, the terminal end 284 being on an opposite end of the plate 274 from the base 276. The curved front surface 280 may include a sharp, cutting edge 286.

The plate 274 of each of the teeth 272 extends from the head 246. In the example shown, the plate 274 is contained within a plane perpendicular to the head longitudinal axis 252. In FIG. 34, the head 246 is shown with a plurality of slots 287 along the first side 254, each slot 287 receiving one of the teeth 272. Back plate 288 (FIG. 20) within the head 246 is used to help hold the teeth 272 in the slots 287, the slots 287 being sized to hold the teeth 272 in the head 246. In the example of FIG. 20, the slots 287 are in the first body piece 380.

In reference now to FIG. 33, in which the cover member 270 is removed for purposes of clarity, the dematting teeth 272 are arranged in a manner to be able to address fur matts of various sizes (e.g., small, medium, and large matts). This function is achieved by having the dematting teeth 272 spaced apart from each other at non-uniform distances. In the example shown, the dematting teeth 272 have at least a first spacing section 360 and a second spacing section 362. Within each of the spacing sections 360, 362, the dematting teeth 272 are spaced uniformly from each other. The spacing between the dematting teeth 272 is smaller in the first spacing section 360 than the second spacing section 362.

In the example shown, the first spacing section 360 is adjacent to the handle 222, and the second spacing section 362 is adjacent to the terminal end/free end 250 of the head 246. Variations are possible, including more spacing sections, incremental spacing of the teeth 272. There can also be uniform spacing throughout all of the teeth 272.

There can be a variety of numbers of dematting teeth 272. For example, there can be at least 8, or at least 10; no greater than 30, or no greater than 20. In many cases, there are between 12-18 dematting teeth 272. In the example shown, there are 15 dematting teeth 272. In the non-limiting example shown, the first spacing section 360 has more teeth

272 than the second spacing section 362. For example, the first spacing section 360 can have 7-10 teeth 272, while the second spacing section 362 can have 5-7 teeth 272.

The second grooming characteristic can be one of many. In the example shown, the second grooming characteristic is combing. By "combing", it is meant a tool used to comb/to untangle fur or hair.

In this embodiment, the second section 268 has a plurality of spaced comb tines 294. In the example shown, the tines 294 are contained in a common plane that is perpendicular to each plate 274 of the dematting teeth 272. Each of the tines 294 extends from the second side 256 of the head 246. For example, each of the tines 294 projects through and from holes 384 (FIG. 35) of the second body piece 382.

Many different shapes for the tines 294 are possible. In the example of FIG. 20, each tine 294 has a generally round cross-section and extends along a cylindrical body 296, narrowing to a free, terminal end 298. At an end opposite of the terminal end 298 is a base end 386, each having a protrusion 388. The protrusions 388 hold the tines 294 within the second body piece 382. The back plate 288 is against the protrusions 388, to trap the protrusions 388 between the back plate 288 and an inside of the second body piece 382.

In reference now to FIG. 33, the comb tines 294 are arranged in a manner to be able to address various thicknesses or lengths of hair or fur. This function is achieved by having the comb tines 294 spaced apart from each other at non-uniform distances. In the example shown, the comb tines 294 have at least a first spacing region 364 and a second spacing region 366. Within each of the spacing regions 364, 366, the comb tines 294 are spaced uniformly from each other. The spacing between the comb tines 294 are smaller in the first spacing region 364 than the second spacing region 366. In this example, the first spacing region 364 is adjacent to the handle 222, and the second spacing region 366 is adjacent to the terminal end/free end 250 of the head 246. Variations are possible, including more spacing regions, or groups of three or several of the tines 294 having a same spacing, with other groups of three or several of the tines 294 having a same spacing but different from other groups of tines 294. There can also be uniform spacing between all of the tines 294.

There can be a variety of numbers of comb tines 294. For example, there can be at least 8, or at least 10; no greater than 30, or no greater than 20. In many cases, there are between 12-18 comb tines 294. In the example shown, there are 15 comb tines 294. In the example shown, there are more comb tines 294 in the first spacing region 364 than the second spacing region 366. For example, the first spacing region 364 can have 7-10 tines 294, and the second spacing region 366 can have 5-7 tines 294.

The cover member 270 includes a plurality of slots 310, which are positioned and sized to receive the dematting teeth 272. As such, when the cover member 270 pivots from the open position (FIG. 19) to the closed position (FIG. 17), covering the first section 266, each of the teeth 272 is received within a respective one of the slots 310. This action will eject hair or fur collected between the teeth 272.

Figure 29:
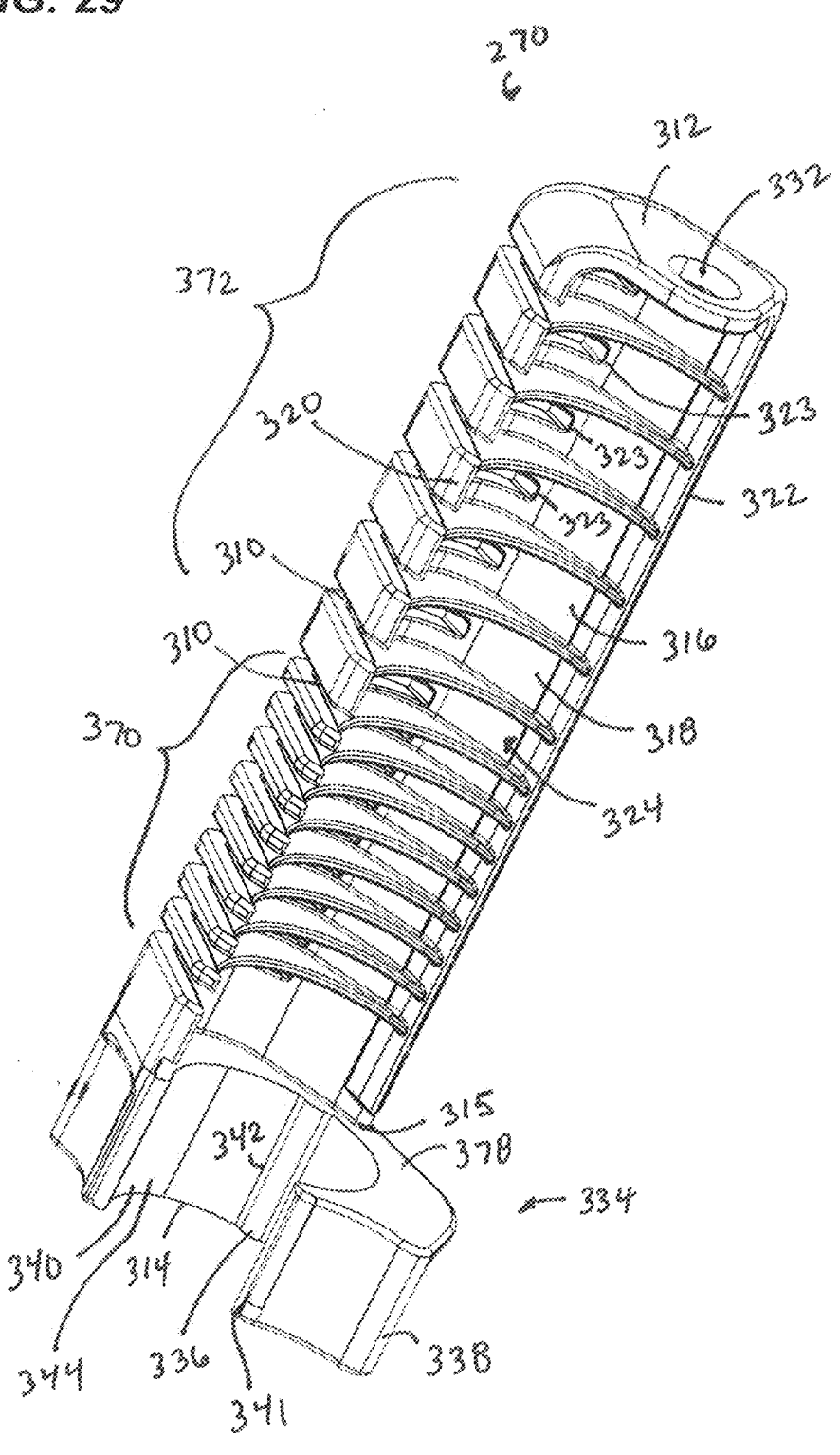
FIG. 29 is a perspective view of the cover used with the grooming tool of FIG. 17.
Figure 30:
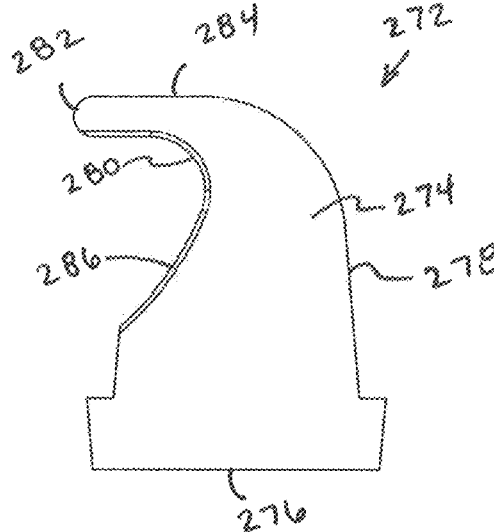
FIG. 30 is a top plan view of one of the dematting teeth used with the grooming tool of FIG. 17.

Attention is directed to FIG. 29, which depicts a preferred embodiment of the cover member 270. The cover member 270 has an end wall 312 and an opposite end 314. A wall section 316 extends between the end wall 312 and end 314. The wall section 316 forms an enclosure 318 for covering the teeth 272. The wall section 316, in the example shown, is curved having a cross-section in a general C-shape, with a pair of free end rims 320, 322. The wall section defines an opening 324, between the end rims 320, 322, which allows the teeth 272 to be selectively covered and uncovered by the cover member 270.

The wall section 316 has the slots 310, along the wall section 316 between the end wall 312 and a base end 315. Each of the slots 310 is generally parallel to the end wall 312. Each of the slots 310 is an open slot, being open at the end rim 320 and extending along the wall section 316, but only partially and ending at a closed slot end 323 before reaching end rim 322. Each slot 310 has a width sized to receive one of the dematting teeth 272, so that the plate 274 is generally parallel to and sandwiched between opposite sides of each slot 310.

The slots 310 have the same non-uniform spacing between them as the dematting teeth 372. As such, there is a cover member first spacing section 370 a cover member second spacing section 372. The slots 310 in the cover member first spacing section 370 are spaced and sized to receive the teeth 272 in the first spacing section 360, while the slots 310 in the cover member second spacing section 372 are spaced and sized to receive the teeth 272 in the second spacing section 362.

Figure 27:
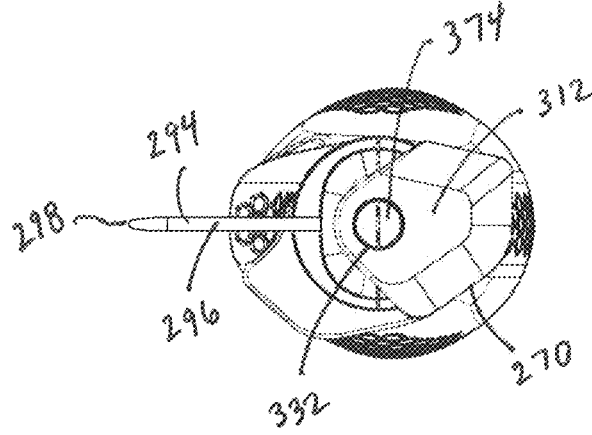
FIG. 27 is a front end view of the grooming tool of FIG. 17.
Figure 28:
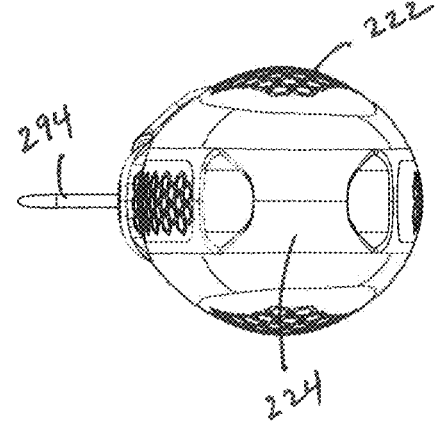
FIG. 28 is a rear end view of the grooming tool of FIG. 17.

The end wall 312 includes an aperture 332 passing therethrough. The aperture 332 may be provided to accommodate a suitable fastener 374 to pivotally (swivelably or rotatably) connect the cover member 270 to the handle 222 (FIGS. 18 and 27).

In some implementations, when the cover member 270 moves from the open (uncovered) position (FIG. 19), to the closed (covered) position (FIG. 17) covering the first section 266, as the slots 310 slide around each of the dematting teeth 272, hair or fur in the teeth 272 may be ejected or pushed away from the head 246. As such, when the cover member 270 pivots to a position covering the first section 266, the cover member 270 removes hair or fur from the first section 266.

In accordance with principles of this disclosure, the grooming tool 220 has a locking mechanism 334. The locking mechanism 334 selectively locks and unlocks the cover member 270 in one of the closed position (FIG. 17), covering the first section 266, or an open position (FIG. 19), uncovering or exposing the first section 266.

While a variety of implementations are possible, in the example shown (FIGS. 29, 31), the locking mechanism 134 illustrated includes a first lock member 336. The first lock member 336 is on the cover member 270. For example, the first lock member 336 projects from a portion 378 of the cover member 270. In the non-limiting example shown, the portion 378 comprises a curved wall section 340, next to the base end 315. The curved wall section 340 starts about even with end rim 320 and curves around to partially wrap against the body 247 for about 220-280° to a free end 341.

Figure 31:
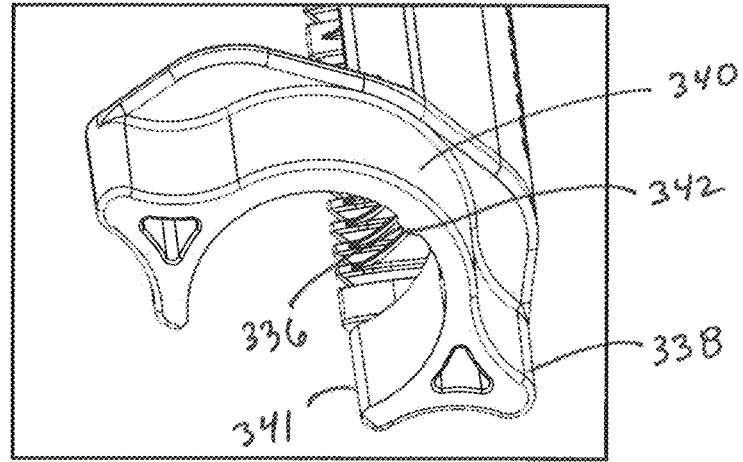
FIG. 31 is an enlarged, perspective view of a first member of a lock mechanism on the head of the grooming tool of FIG. 17.

FIG. 31 illustrates an enlarged, perspective view of the first lock member 336. The first lock member 336 is embodied as a rib 342 extending longitudinally (parallel to the handle longitudinal axis 228) along an inner surface 344 of the curved wall section 340, and projecting therefrom.

The curved wall section 340 further includes a lobe 338 projecting radially therefrom. In the example shown, the lobe 338 is adjacent to the free end 341. The lobe 338 is useful for a user's thumb to contact in order to rotate the cover member 270 between the closed position (FIG. 17) and open position (FIG. 19) and vice-versa.

Figure 32:
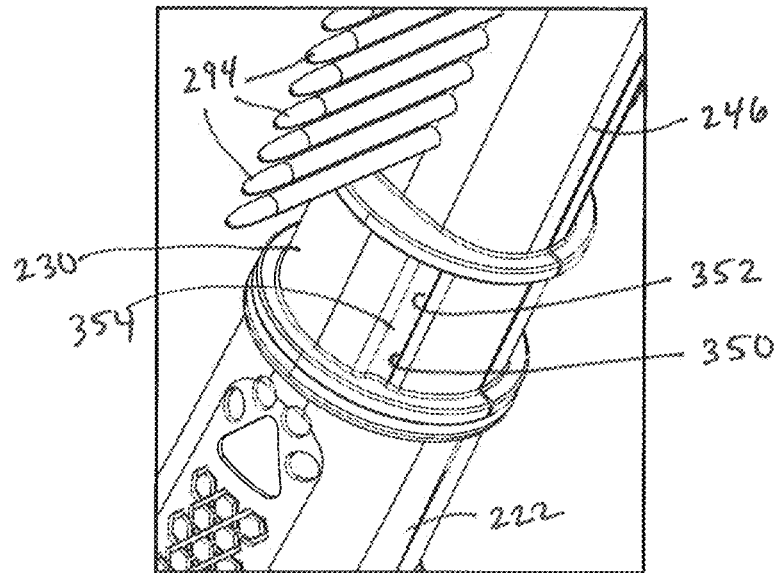
FIG. 32 is an enlarged, perspective view of a second member of the lock mechanism on the handle of the grooming tool of FIG. 17.

The locking mechanism 334 further includes a second lock member 350 (FIG. 32). The second lock member 350 includes a recess arrangement 352 in the handle core 230 of the handle 222. For example, the recess arrangement 352 includes at least a first recesses 354 along the side of the handle core 230. The recess 354 is sized to receive the first lock member 336. The recess 354 is embodied here as smooth, curved indented surfaces extending longitudinally (parallel to) the handle longitudinal axis 228.

In use, when the cover member 270 is in the closed (covered) position, the rib 342 is positioned in the first recess 354. The user will use his thumb or finger to push against the lobe 338, which will rotate the cover member 270 about the head 246 and uncover or expose the dematting teeth 272. To move the cover member 270 back to the closed (covered) position, the actions are reversed—the lobe 338 is push against in the opposite direction, rotating the cover member 270 back to the closed position, with the rib 342 in position in the first recess 354.

Example Methods of Use

In operation, the grooming tool 220 can be used to groom an animal, such as a dog. The method includes a step of dematting hair or fur on an animal. This step includes pivoting the cover member 270 on the grooming tool 220 to uncover the plurality of spaced, dematting teeth 272 on the head 246 of the grooming tool 220. This step includes using the dematting teeth 272 to remove matted hair or fur.

The method also includes combing hair on the animal by using the plurality of spaced comb tines 294 on the head 246. The comb tines 294 extend in a direction opposite from the dematting teeth 272.

The method further includes holding the handle 222 attached to the head 246. The handle 222 has handle longitudinal axis 228, such that a human hand wraps around the handle longitudinal axis 228 while holding. The head 246 has head longitudinal axis 252, preferably co-linear with the handle longitudinal axis 228.

The method further includes a step of removing hair from the dematting teeth 272 by pivoting (or rotating) the cover member 270 to a position covering the dematting teeth 272. In some examples, this can include moving the cover member 270 from the open (uncovered) position, to the closed (covered) position covering the first section 266, and sliding the slots 310 slide around each of the dematting teeth 272, to push or eject hair or fur in the teeth 272 away from the head 246.

The method can further include a step of locking the cover member 270 in the closed position, covering the dematting teeth 272. This step may include moving the first lock member 336 from engagement with the second lock member 350. This may include moving the rib 342 from the first recess 354.

The method can also include using the dematting teeth 272 and comb tines 294, when the dematting teeth 272 are spaced from each other at non-uniform distances, in which the dematting teeth 272 have at least first and second spacing sections 360, 362; the dematting teeth 272 being spaced uniformly from each other within each of the first and second spacing sections 360, 362, and spacing between the dematting teeth 272 being smaller in the first spacing section 360 than the second spacing section 362. The comb tines 294 are spaced from each other at non-uniform distances, in which the comb tines 294 have at least first and second spacing regions 364, 366; the comb tines 294 being spaced uniformly from each other within each of the first and second spacing regions 364, 366, and spacing between the comb tines 294 being smaller in the first spacing region 364 than the second spacing region 366.

The grooming tool 220 is used on poodles, poodle-crosses (doodles), and other dogs or animals. The variable spacing of the teeth 272 and tines 294 is useful in handling the various lengths and thicknesses of the hair/fur. The movable cover member 270 is convenient to cover the dematting teeth 272, to protect them from damage and to prevent injury to the user. The cover member 270 also helps to eject the fur from the teeth 272.

Variations

Some variations can include only a single grooming section. For example, one variation can include just a single grooming section of dematting teeth, along with the cover member to protect the teeth (in the closed position) and to eject the fur when the cover is moved between the open and closed positions. Some variations can include more than two grooming sections, such as brushes and deshedder teeth. In some variations, within the grooming sections, there can be more than a single row. For example, there can be two or more rows of comb tines.

The above describes example principles. Many embodiments can be made using these principles.

What is claimed is:

1. A grooming tool for use on an animal; the tool comprising:
   (a) a handle defining a handle longitudinal axis; the handle being configured and sized for grasping by a human hand, such that a human hand wraps around the handle longitudinal axis during grasping;
   (b) a head extending from the handle; the head having a head longitudinal axis co-linear with or parallel to the handle longitudinal axis;
   (c) a first section of a first grooming characteristic extending from the head in a first direction perpendicular to the head longitudinal axis;
   (d) a second section of a second grooming characteristic different from the first grooming characteristic; the second section extending from the head in a second direction perpendicular to the head longitudinal axis; the second direction being different from the first direction; and
   (e) a movable cover member pivotably attached to the head and positionable to selectively cover and uncover the first section.

2. The grooming tool of claim 1, wherein the second direction is opposite of the first direction, such that the first section and second section are 180° apart, extending in opposite directions.

3. The grooming tool of claim 1, wherein the first grooming characteristic is dematting, and wherein the first section has a plurality of spaced, dematting teeth.

4. The grooming tool of claim 3, wherein each of the dematting teeth includes a plate contained within a plane perpendicular to the head longitudinal axis, the plate comprising:
   (a) a base in contact with the head;
   (b) a straight rear surface extending from the base;
   (c) a curved front surface, opposite of the rear surface; and
   (d) a tine at a terminal end.

5. The grooming tool of claim 1, wherein the second grooming characteristic is combing, wherein the second section has a plurality of spaced comb tines.

6. The grooming tool of claim 1, wherein the cover member is positioned relative to the first section such that when the cover member pivots to a position covering the first section, the cover member removes hair or fur from the first section.

7. The grooming tool of claim 1, further including a locking mechanism to selectively lock and unlock the cover member in a closed position, covering the first section.

8. The grooming tool of claim 3, wherein:
   (a) the second grooming characteristic is combing, wherein the second section has a plurality of spaced comb tines; and
   (b) there are between 10-15 dematting teeth, and 10-15 comb tines.

9. The grooming tool of claim 1, further including a body; the body including a handle core and the head; the handle core being covered by a handle cover; the handle core and handle cover defining the handle.

10. The grooming tool of claim 9, wherein the body includes a first body section and a second body section mated together with the head longitudinal axis passing therebetween.

11. The grooming tool of claim 10, further including a back panel held between the first body section and the second body section.

12. The grooming tool of claim 10, wherein the first body section holds a plurality of spaced, dematting teeth.

13. The grooming tool of claim 12, wherein the dematting teeth have at least first and second spacing sections; the dematting teeth being spaced uniformly from each other within each of the first and second spacing sections; and spacing between the dematting teeth being smaller in the first spacing section than the second spacing section.

14. The grooming tool of claim 3, wherein the dematting teeth have at least first and second spacing sections; the dematting teeth being spaced uniformly from each other within each of the first and second spacing sections; and spacing between the dematting teeth being smaller in the first spacing section than the second spacing section.

15. The grooming tool of claim 13, wherein the first spacing section is adjacent to the handle, and the second spacing section is adjacent to a terminal end of the head, remote from the handle.

16. The grooming tool of claim 10, wherein the second body section holds a plurality of spaced, comb tines.

17. The grooming tool of claim 16, wherein the comb tines have at least first and second spacing regions; the comb tines being spaced uniformly from each other within each of the first and second spacing regions; and spacing between the comb tines being smaller in the first spacing region than the second spacing region.

18. The grooming tool of claim 5, wherein the comb tines have at least first and second spacing regions; the comb tines being spaced uniformly from each other within each of the first and second spacing regions; and spacing between the comb tines being smaller in the first spacing region than the second spacing region.

19. The grooming tool of claim 17, wherein the first spacing region is adjacent to the handle, and the second spacing region is adjacent to a terminal end of the head, remote from the handle.

20. The grooming tool of claim 9 further including a locking mechanism to selectively lock and unlock the cover member in a closed position, covering the first section.

21. The grooming tool of claim 20, wherein the locking mechanism includes a first lock member projecting from the cover member and a second lock member in the head; the second lock member having a recess arrangement receiving the first lock member.

22. The grooming tool of claim 9, wherein the handle cover has a thumb rest and a finger rest located 180° relative to each other.

23. The grooming tool of claim 22, wherein the thumb rest is located in a plane aligned with the second section; and the finger rest is located in a plane aligned with the first section.

\* \* \* \* \*